US009354407B2

(12) United States Patent
Teo et al.

(10) Patent No.: US 9,354,407 B2
(45) Date of Patent: May 31, 2016

(54) BIASING ASSEMBLY FOR A LATCHING MECHANISM

(71) Applicant: FINISAR CORPORATION, Sunnyvale, CA (US)

(72) Inventors: Tat Ming Teo, Singapore (SG); Chris K. Togami, San Jose, CA (US); Frank J. Flens, Campbell, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 243 days.

(21) Appl. No.: 13/963,900

(22) Filed: Aug. 9, 2013

(65) Prior Publication Data
US 2014/0044398 A1 Feb. 13, 2014

Related U.S. Application Data

(60) Provisional application No. 61/682,069, filed on Aug. 10, 2012.

(51) Int. Cl.
*G02B 6/42* (2006.01)

(52) U.S. Cl.
CPC ............ *G02B 6/4261* (2013.01); *G02B 6/4204* (2013.01); *G02B 6/428* (2013.01); *G02B 6/4249* (2013.01); *G02B 6/4278* (2013.01); *Y10T 29/49863* (2015.01)

(58) Field of Classification Search
CPC .............................. G02B 6/4261; G02B 6/4284
See application file for complete search history.

(56) References Cited

U.S. PATENT DOCUMENTS

| 4,636,018 A | 1/1987 | Stillie |
| 5,214,730 A | 5/1993 | Nagasawa et al. |
| 5,267,407 A | 12/1993 | Bornancini |
| 5,619,604 A | 4/1997 | Shiflett et al. |
| 5,682,450 A | 10/1997 | Patterson et al. |
| 5,732,174 A | 3/1998 | Carpenter et al. |
| 5,737,463 A | 4/1998 | Weiss et al. |
| 5,743,785 A | 4/1998 | Lundberg et al. |

(Continued)

FOREIGN PATENT DOCUMENTS

| CN | 102100010 A | 6/2011 |
| EP | 0439939 | 9/1995 |

(Continued)

OTHER PUBLICATIONS

Office Action mailed Jun. 27, 2014 in U.S. Appl. No. 12/717,352.

(Continued)

*Primary Examiner* — Michelle R Connelly
(74) *Attorney, Agent, or Firm* — Maschoff Brennan

(57) ABSTRACT

An example embodiment includes a communication module. The communication module includes a shell, a printed circuit board assembly ("PCBA") at least partially positioned within the shell, an optical transmitter electrically coupled to the PCBA, an optical receiver electrically coupled to the PCBA, and a biasing assembly. The biasing assembly includes a latch cover configured to be attached to the shell, a slider, and a spring. The slider is configured to operate a latching mechanism that releasably connects the module to a host device through a mechanical connection. The slider includes a main body including a first end, an arm extending from the first end, and a stopper feature extending from the arm. The spring is positioned between the latch cover and the stopper feature to bias the latching mechanism.

20 Claims, 18 Drawing Sheets

(56) References Cited

U.S. PATENT DOCUMENTS

| | | |
|---|---|---|
| 6,085,003 A | 7/2000 | Knight |
| 6,422,760 B1 | 7/2002 | Matasek et al. |
| 6,533,603 B1 | 3/2003 | Togami |
| 6,848,836 B2 | 2/2005 | Ueda et al. |
| 6,884,097 B2 | 4/2005 | Ice |
| 6,886,988 B2 | 5/2005 | Brown et al. |
| 7,114,857 B1 | 10/2006 | Kayner et al. |
| 7,118,281 B2 | 10/2006 | Chiu et al. |
| 7,156,562 B2 | 1/2007 | Mazotti et al. |
| 7,217,043 B2 | 5/2007 | Schunk |
| 7,303,336 B2 | 12/2007 | Kayner et al. |
| 7,309,173 B2 | 12/2007 | Epitaux et al. |
| 7,488,899 B2 | 2/2009 | Kirby et al. |
| 7,731,432 B2 | 6/2010 | Theodoras, II et al. |
| 7,766,672 B1 | 8/2010 | Chiang |
| 7,841,779 B1 | 11/2010 | Bianchini et al. |
| 7,967,590 B2 | 6/2011 | Grunitz et al. |
| 8,057,109 B2 | 11/2011 | Flens et al. |
| 8,113,723 B2 | 2/2012 | Togami et al. |
| 8,292,518 B2 | 10/2012 | Togami et al. |
| 8,328,435 B2 | 12/2012 | Teo et al. |
| 8,391,667 B2 | 3/2013 | Teo et al. |
| 8,459,881 B2 | 6/2013 | Togami et al. |
| 2002/0115342 A1 | 8/2002 | Stricot et al. |
| 2003/0048996 A1 | 3/2003 | Lowe et al. |
| 2003/0072137 A1 | 4/2003 | Yen et al. |
| 2004/0105625 A1 | 6/2004 | Ueda et al. |
| 2004/0120660 A1 | 6/2004 | Go et al. |
| 2005/0208822 A1 | 9/2005 | Ishigami et al. |
| 2005/0254821 A1 | 11/2005 | Theodoras, II |
| 2005/0259994 A1 | 11/2005 | Zhang et al. |
| 2005/0265650 A1 | 12/2005 | Priyadarshi et al. |
| 2006/0262026 A1 | 11/2006 | Gainey et al. |
| 2006/0280408 A1 | 12/2006 | Anderson et al. |
| 2007/0058911 A1 | 3/2007 | Yu et al. |
| 2008/0044143 A1 | 2/2008 | Wang et al. |
| 2008/0226239 A1 | 9/2008 | Oki et al. |
| 2009/0253292 A1 | 10/2009 | Wu |
| 2009/0279831 A1 | 11/2009 | Luo et al. |
| 2009/0290619 A1 | 11/2009 | Flens et al. |
| 2010/0080518 A1 | 4/2010 | Teo et al. |
| 2010/0296817 A1 | 11/2010 | Togami et al. |
| 2011/0080008 A1* | 4/2011 | Teo ............. H01R 13/6272 292/197 |
| 2011/0081119 A1 | 4/2011 | Togami et al. |
| 2012/0148198 A1 | 6/2012 | Togami et al. |
| 2012/0190223 A1 | 7/2012 | Wu |
| 2013/0178090 A1 | 7/2013 | Teo et al. |

FOREIGN PATENT DOCUMENTS

| | | |
|---|---|---|
| EP | 2281345 | 2/2011 |
| EP | 2283145 | 2/2011 |
| EP | 09751521.7 | 4/2012 |
| JP | 09171127 | 6/1997 |
| WO | WO 2009/143293 | 11/2009 |

OTHER PUBLICATIONS

Supplementary European Search Report completed Aug. 24, 2011 in connection with corresponding European Patent Application No. 09 75 1521 (5 pgs).
International Search Report and Written Opinion from related PCT application No. PCT/US2013/054407 Mailed Nov. 26, 2013.
U.S. Appl. No. 13/784,730, Sep. 12, 2013, Office Action.
U.S. Appl. No. 12/629,650, filed Jun. 28, 2012, Office Action.
U.S. Appl. No. 12/629,650, filed Sep. 27, 2012, Office Action.
U.S. Appl. No. 12/629,673, filed May 14, 2012, Office Action.
U.S. Appl. No. 12/629,673, filed Jul. 30, 2012, Notice of Allowance.
U.S. Appl. No. 13/372,403, filed Jun. 21, 2012, Notice of Allowance.
U.S. Appl. No. 12/468,790, filed Feb. 3, 2011, Office Action.
U.S. Appl. No. 12/468,790, filed Jun. 29, 2011, Notice of Allowance.
U.S. Appl. No. 12/629,673, filed Oct. 5, 2011, Office Action.
U.S. Appl. No. 12/685,916, filed Oct. 7, 2011, Notice of Allowance.
U.S. Appl. No. 12/573,637, filed May 25, 2012, Restriction Requirement.
U.S. Appl. No. 12/573,637, filed Aug. 10, 2012, Office Action.
U.S. Appl. No. 12/573,637, filed Nov. 5, 2012, Notice of Allowance.

* cited by examiner

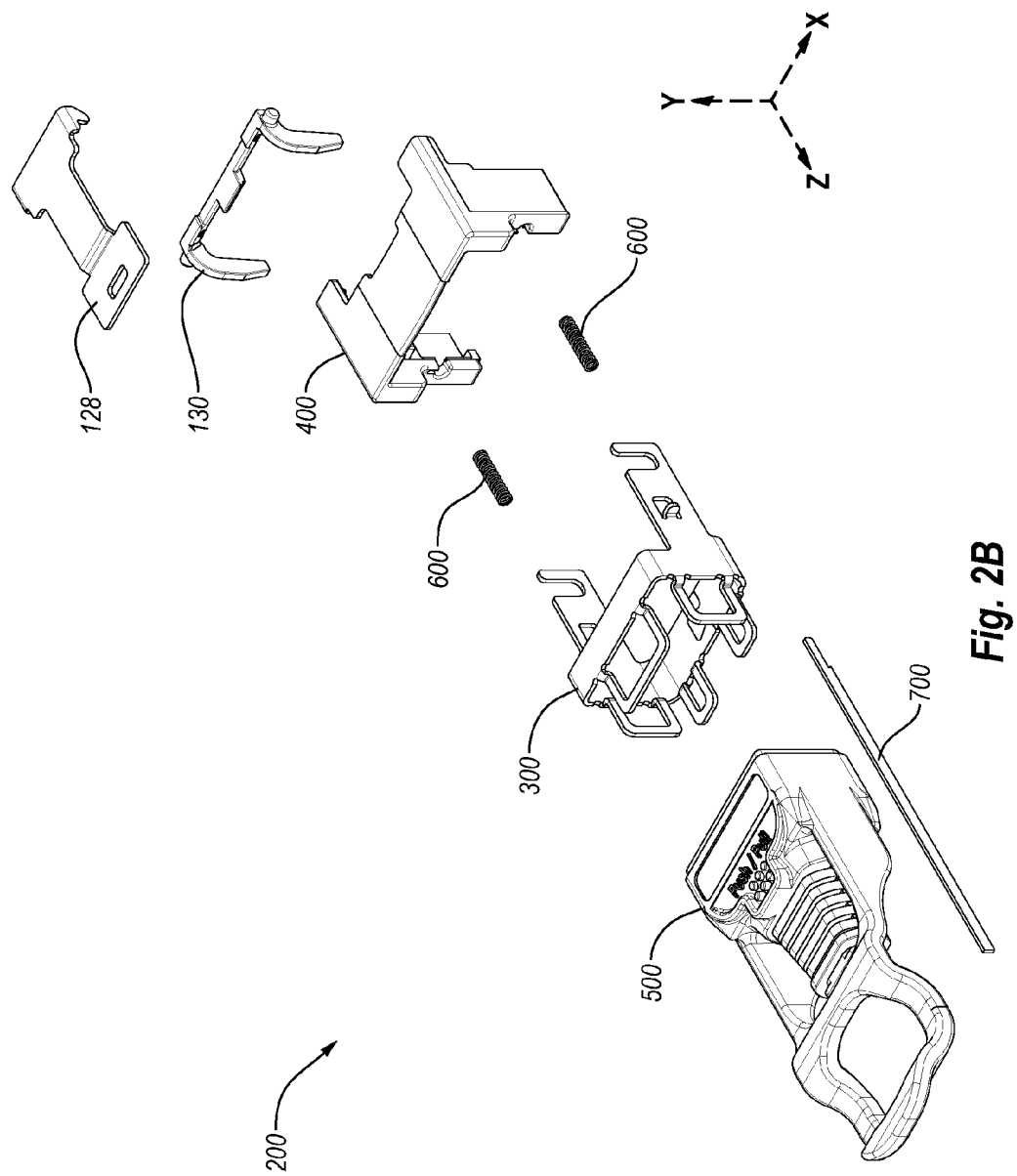

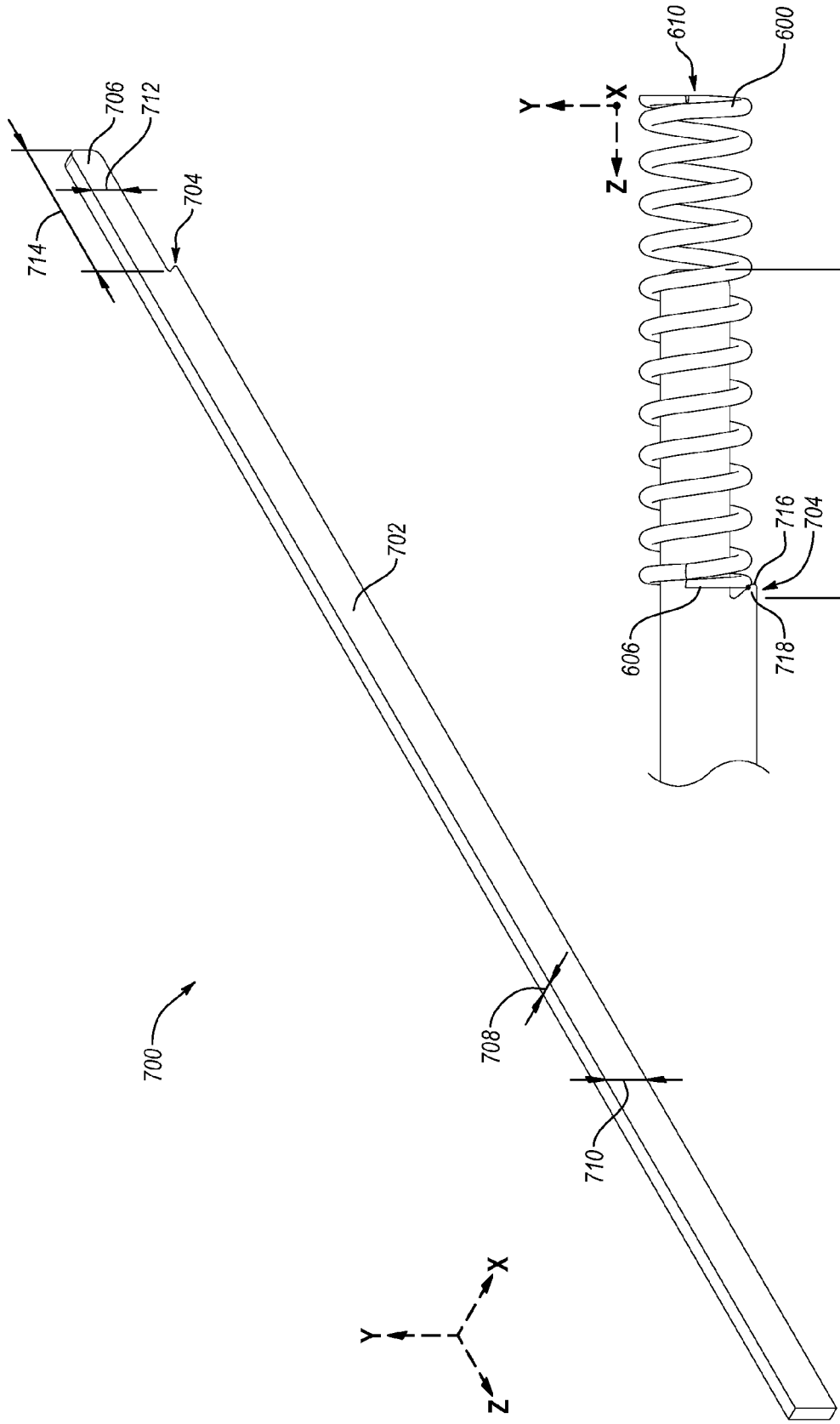

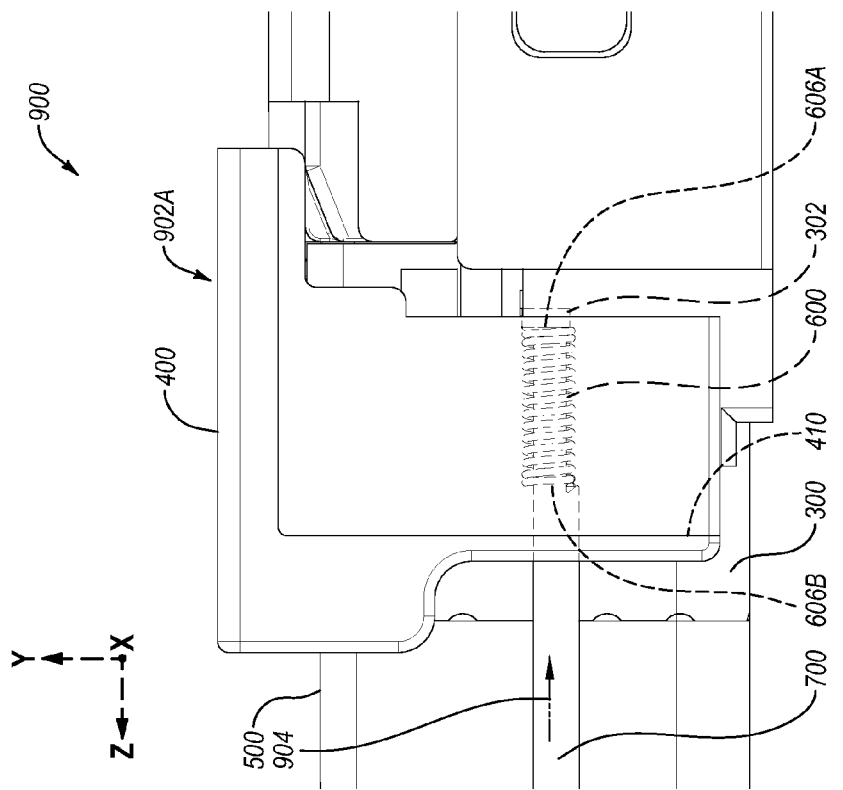
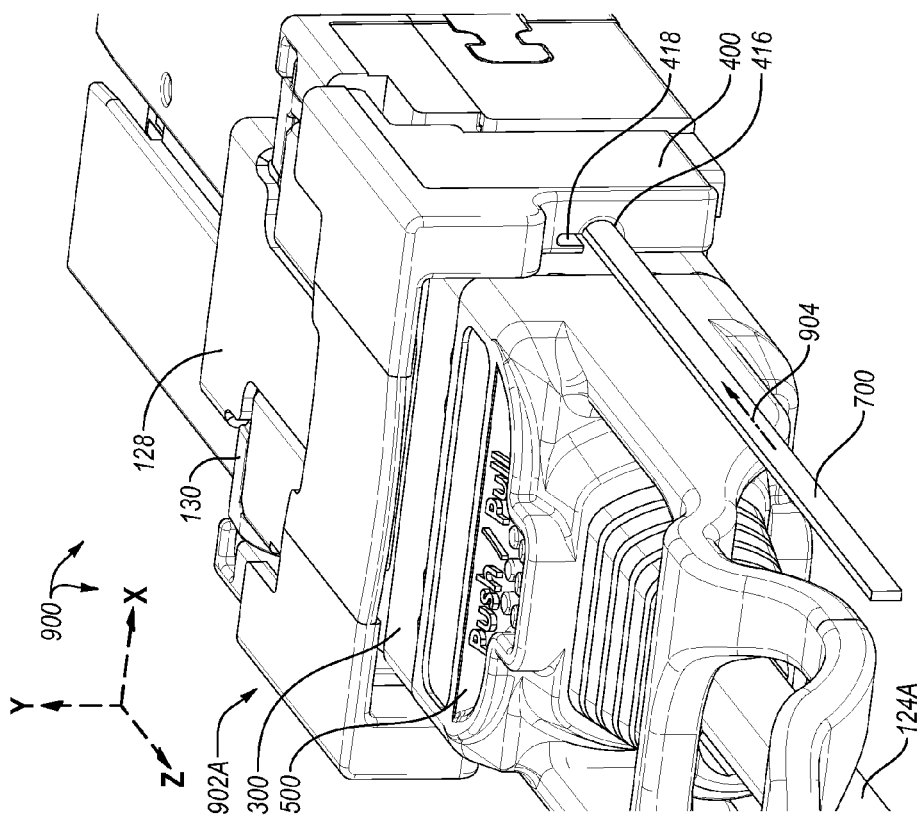
Fig. 9D
Fig. 9C

BIASING ASSEMBLY FOR A LATCHING MECHANISM

CROSS-REFERENCE TO RELATED APPLICATIONS

This patent application claims the benefit of and priority to U.S. Provisional Patent Application No. 61/682,069, filed Aug. 10, 2012, which is incorporated herein by reference in its entirety.

FIELD

Embodiments relate generally to communications modules. More particularly, some example embodiments relate to latching mechanisms for securing a communication module within a receptacle of a host device.

BACKGROUND

Communication modules, such as electronic or optoelectronic transceivers or transponder modules, are increasingly used in electronic and optoelectronic communication. Some modules are pluggable, which permits the module to be inserted into and removed from a receptacle of a host device, such as a host computer, a switching hub, a network router, or a switch box. Each module typically communicates with a printed circuit board assembly ("PCBA") of the host device by transmitting and/or receiving electrical data signals to and/or from the host device PCBA. These electrical data signals can also be transmitted by the module outside the host device as optical and/or electrical data signals.

For a module to be pluggable, various mechanisms have been developed to releasably secure modules within host device receptacles. Associated with the mechanisms are biasing assemblies that sustain and/or return the latching mechanism to a given position. However, the biasing assemblies suffer from various shortcomings. For example, some biasing assemblies may include poorly initially-positioned springs due to deficient installation processes. Additionally, the mechanisms may suffer from poorly secured springs that jam during operation. These and other shortcomings may unnecessarily wear components of the module and/or lead to functional failure.

The subject matter claimed herein is not limited to embodiments that solve any disadvantages or that operate only in environments such as those described above. Rather, this background is only provided to illustrate one exemplary technology area where some embodiments described herein may be practiced.

SUMMARY OF SOME EXAMPLE EMBODIMENTS

Some embodiments relate generally to communications modules. More particularly, some example embodiments relate to latching mechanisms for securing a communication module within a receptacle of a host device.

An example embodiment includes a communication module. The communication module includes a shell, a printed circuit board assembly ("PCBA") at least partially positioned within the shell, an optical transmitter electrically coupled to the PCBA, an optical receiver electrically coupled to the PCBA, and a biasing assembly. The biasing assembly includes a latch cover configured to be attached to the shell, a slider, and a spring. The slider is configured to operate a latching mechanism that releasably connects the module to a host device through a mechanical connection. The slider includes a main body including a first end, an arm extending from the first end, and a stopper feature extending from the arm. The spring is positioned between the latch cover and the stopper feature to bias the latching mechanism.

Another example embodiment includes a biasing assembly. The biasing assembly includes a slider and a latch cover. The slider is configured to operate a latching mechanism configured to releasably connect a module to a host device. The slider includes a stopper feature. The latch cover includes a spring opening configured such that a spring may be inserted through the latch cover against a stopper feature when the latch cover is in a first position. The spring opening is further configured such that the spring is captured between the latch cover and the stopper feature when the latch cover is in a second position.

Yet another example embodiment includes a method for installing a spring into a module. The method placing a latch cover in a first position with respect to the module and placing the spring on a spring guide with a cross-sectional area complementary to an extraction slot defined in the latch cover. The method also includes inserting the spring through the insertion hole defined in the latch cover. The method also includes abutting a first spring end against the stopper feature. The spring is then compressed against the stopper feature until a second spring end is positioned past an internal surface of the latch cover. The latch cover is then transitioned to a second position. The spring guide is withdrawn through the extraction slot and the spring is allowed to contact the latch cover such that the spring is captured between the latch cover and the stopper feature.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only some embodiments and are therefore not to be considered limiting of its scope. The invention will be described and explained with additional specificity and detail through the use of the accompanying drawings in which:

FIGS. 2A-2B illustrate an example biasing assembly that may be implemented in the communication module of FIGS. 1A-1C;

FIGS. 7A-7B illustrate an example spring guide that may be implemented in the biasing assembly of FIGS. 2A-2B;

FIGS. 9A-9H illustrate multiple views of the biasing assembly of FIGS. 2A-2B during the installation of the spring of FIGS. 6A-6B.

DETAILED DESCRIPTION OF SOME EXAMPLE EMBODIMENTS

Embodiments described herein relate generally to communications modules. More particularly, some example embodiments relate to latching mechanisms for securing a communication module within a receptacle of a host device. In an example embodiment, a biasing assembly enables a communication module with a latching mechanism to return to and maintain a non-activated position. The biasing assembly includes two springs installed between a latch cover and stopper features that extend from arms of a slider. The two springs exert a spring force between the latch cover and the stopper features sufficient to maintain the module in the non-active position. Additionally, if the communication module is activated by a user applying a manipulating force to the slider, a spring return force results. The spring return force is sufficient to return the communication module to the non-activated position.

The embodiments described herein can be implemented in various communication modules including electronic modules and optoelectronic modules. As used herein the term "optoelectronic module" includes modules having both optical and electrical components. Examples of electronic and optoelectronic modules include, but are not limited to, active electrical cables, active optical cables, transponders, transceivers, transmitters, and receivers. Electronic and optoelectronic modules can be used, for instance, in telecommunications networks, local area networks, metro area networks, storage area networks, wide area networks, and the like and can be configured to conform with one or more standardized form factors or multi-source agreements ("MSA's"), including QSFP, CXP, CFP, XFP, and SFP+ form factors, without restriction. It will be appreciated that the electronic and optoelectronic modules need not comply with standardized form factor requirements and may have any size and/or configuration according to a particular design.

The communication modules according to some embodiments can be configured for electrical and/or optical signal transmission and reception at a variety of per-second data rates including, but not limited to, 10 Gigabits per second ("G"), 40 G, 100 G, or higher. As used herein, the terms "10 G", "40 G", "100 G", and similar terms represent rounded approximations of common signaling rates and have the meanings commonly understood by those of skill in the art.

Furthermore, the communication modules according to some embodiments can be configured for optical signal transmission and reception at various wavelengths including but not limited to, 850 nanometers ("nm"), 1310 nm, 1470 nm, 1490 nm, 1510 nm, 1530 nm, 1550 nm, 1570 nm, 1590 nm, or 1610 nm. Further, the communication modules can be configured to support various transmission standards including, but not limited to, Ethernet, Fibre Channel, Infiniband and SONET/SDH.

Figure 1A:
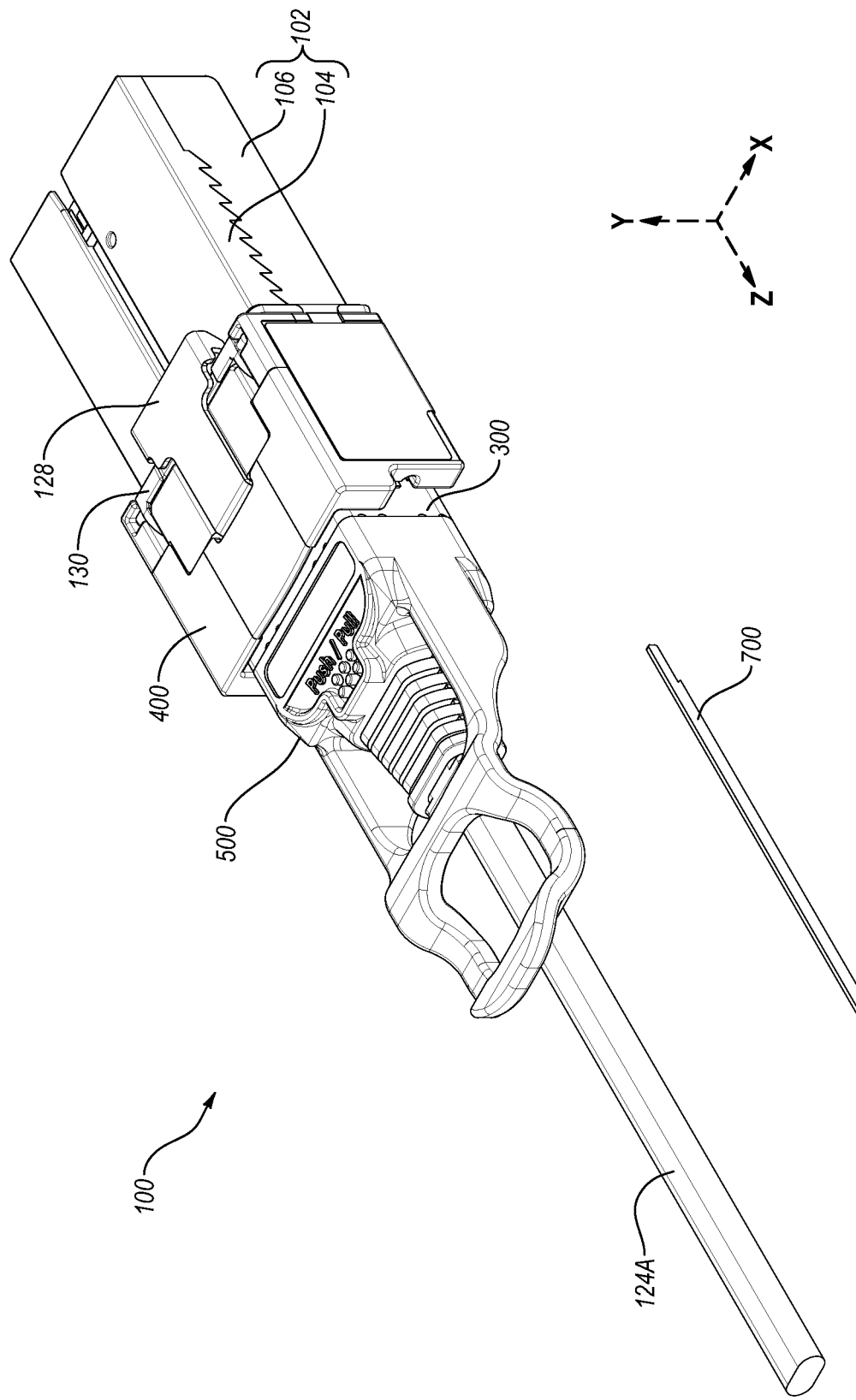
FIGS. 1A-1C illustrate an example communication module in which embodiments of a biasing assembly can be implemented.
Figure 1B:
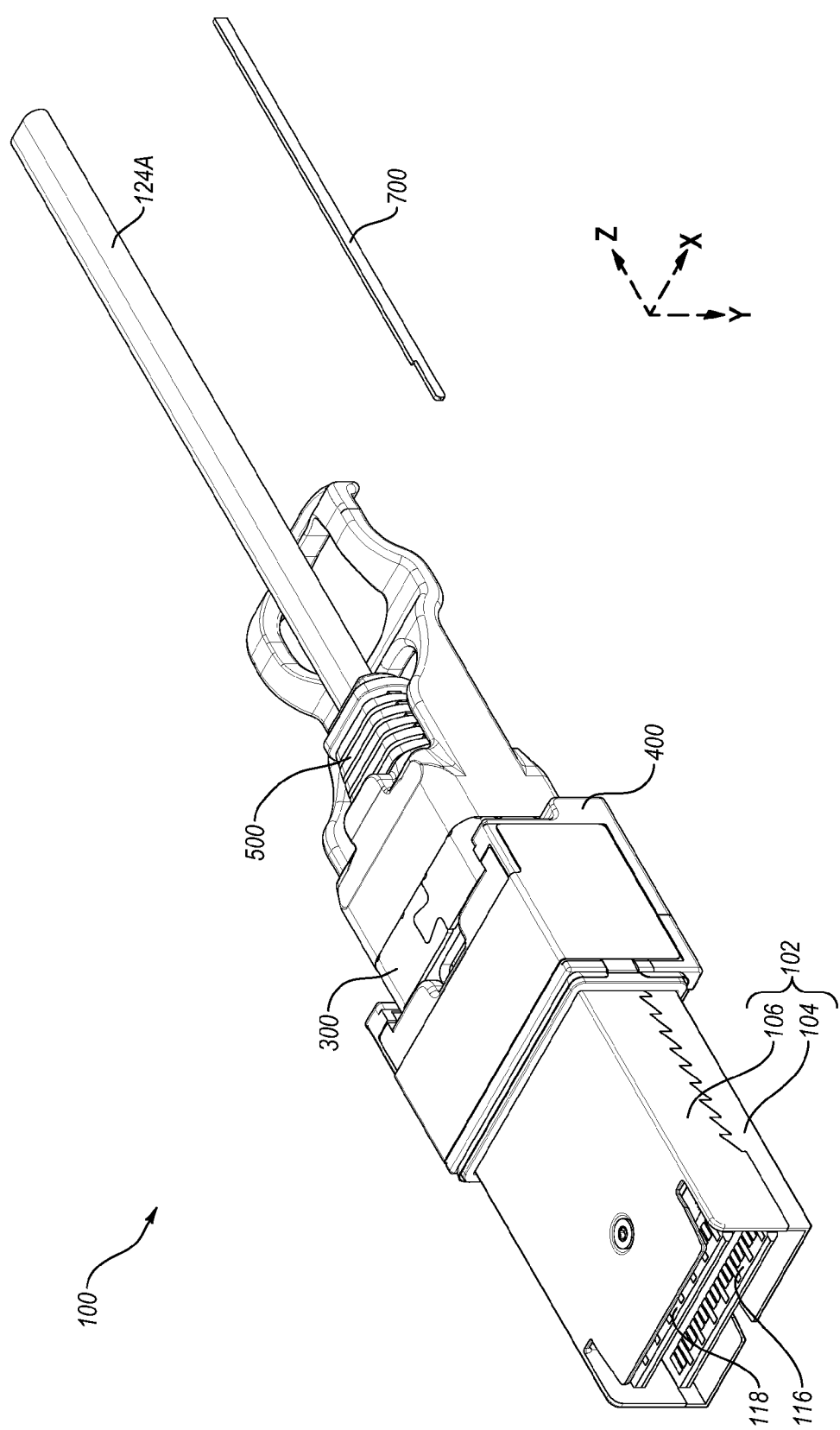
Figure 1C:
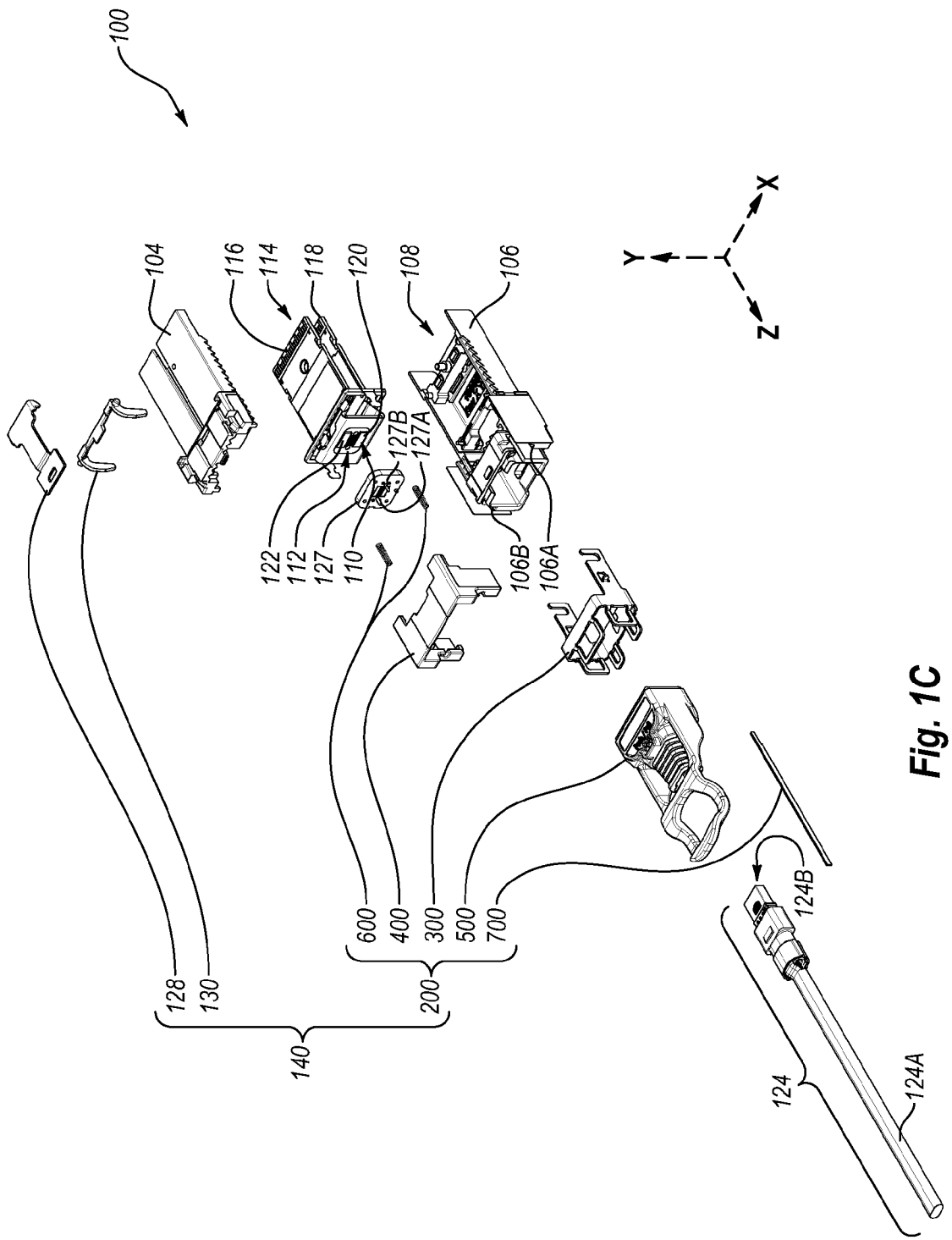

Reference is first made to FIGS. 1A-1C, which depict an example communication module ("module") 100 for use in transmitting and receiving optical signals in connection with a host device (not shown) that is operatively connected in some embodiments to a communication network (not shown). FIGS. 1A-1C include, respectively, a front perspective view, an upside-down rear perspective view, and an exploded front perspective view of the module 100.

As illustrated in FIGS. 1A-1C, the module 100 includes a shell 102 made up of a top shell 104 and a bottom shell 106. The shell 102 is not shown independently in FIG. 1C. Instead, the shell 102 is illustrated as being made up of two components, including the top shell 104 and the bottom shell 106. The shell 102 can alternately or additionally be made up of a unitary component or three or more components.

As best seen in FIG. 1C, although not required in all embodiments, the bottom shell 106 includes two inverse module spring shoulders 106A and 106B. Some details of the inverse module spring shoulders 106A and 106B are provided with respect to FIGS. 4A-4D. The top shell 104 and the bottom shell 106 define a cavity, generally indicated at 108. Within the cavity 108 are disposed at least one optical transmitter 110 and at least one optical receiver 112. In this and other embodiments, the optical transmitter 110 includes a 12×1 array of vertical cavity surface emitting lasers ("VCSELs") and the optical receiver 112 includes a 12×1 array of p-type, intrinsic, n-type ("PIN") photodiodes.

Alternatively, the optical transmitter 110 and/or the optical receiver 112 may include one or more other types of optical transmitters or optical receivers. In these and other embodiments, the optical transmitter 110 and/or the optical receiver 112 may be configured differently. Alternatively still, the module 100 may implement electrical transmitters and receivers, rather than optical transmitters 110 and optical receivers 112.

A printed circuit board assembly ("PCBA") 114 is at least partially disposed in the cavity 108. The PCBA 114 includes, among other things, edge connectors 116 and 118, a laser driver 120, and a post amplifier 122. The edge connectors 116 and 118 interface with a host device to communicate electrical data signals between the host device and the module 100. Electrical data signals received from the host device are provided to the laser driver 120, which drives the optical transmitter 110 to transmit optical data signals representative of the received electrical data signals. Additionally or alternately, optical data signals can be received by the optical receiver 112 which converts the received optical data signals to electrical data signals and provides the electrical data signals to the post amplifier 122 for amplification prior to being communicated to the host device via one or both of edge connectors 116 and 118.

With continued reference to FIG. 1C, a cable assembly 124 is provided that includes a plurality of optical fibers (not shown) disposed within cable cladding 124A and a fiber optic connector 124B. In other examples, the cable assembly 124 includes a plurality of electrical wires and an electrical connector, rather than optical fibers and a fiber optic connector 124B. Alternately, the cable assembly 124 is omitted altogether in some configurations.

The optical fibers of cable assembly 124 may include, for example, 12 transmit multimode parallel ribbon fibers and 12 receive multimode parallel ribbon fibers, or a total of 24 multimode parallel ribbon fibers. In other examples, the optical fibers are multimode fibers or single mode fibers having any number of transmit fibers and any number of receive fibers implemented in a parallel ribbon or as individual fibers.

The module 100 additionally includes a lens block 127 with overmolded lens pins 127A and 127B. The fiber optic connector 124B, lens block 127 and lens pins 127A and 127B collectively cooperate to align the optical fibers of the cable assembly 124 with the optical transmitter 110 and optical receiver 112 such that optical signals can be emitted onto and/or received from the optical fiber(s) of cable assembly 124.

The module 100 further includes a latching mechanism 140 (FIG. 1C) having a latch 128 (FIGS. 1A & 1C), a cam 130 (FIGS. 1A & 1C) and a biasing assembly 200 (FIG. 1C). The biasing assembly 200 may include a slider 300 (FIGS. 1A-1C), a latch cover 400 (FIGS. 1A-1C), a boot 500 (FIGS. 1A-1C), and one or more springs 600 (FIG. 1C). Optionally, the biasing assembly 200 may include a spring guide 700 (FIG. 1A-1C).

Briefly, the latching mechanism 140 is configured to releasably secure the module 100 within a receptacle of a host device. Additional details regarding some aspects of a latching mechanism similar to the latching mechanism 140 are included in U.S. Pat. No. 8,391,667 issued Mar. 5, 2013. The foregoing patent is herein incorporated by reference in its entirety. The biasing assembly 200 biases the latching mechanism 140 in a non-activated position. Some additional details regarding the biasing assembly 200 are provided below.

As shown in FIGS. 1A-1C, the module 100 may be implemented as an active optical cable in which the module 100 includes optical transmission media (e.g., the optical fibers of cable assembly 124), components used to convert electrical signals to optical signals (e.g., laser driver 120 and optical transmitter 110), and components used to convert optical signals to electrical signals (e.g., optical receiver 112 and post amplifier 122) all integrated in a single apparatus (e.g., the module 100). Other embodiments include active electrical cables as well as modules lacking integrated transmission media.

As illustrated in FIGS. 1A-1C, the module 100 is substantially compliant with the CXP form factor as defined by the Infiniband Trade Association. In other embodiments, the module 100 is configured to be substantially compliant with other form factors.

Figure 2A:
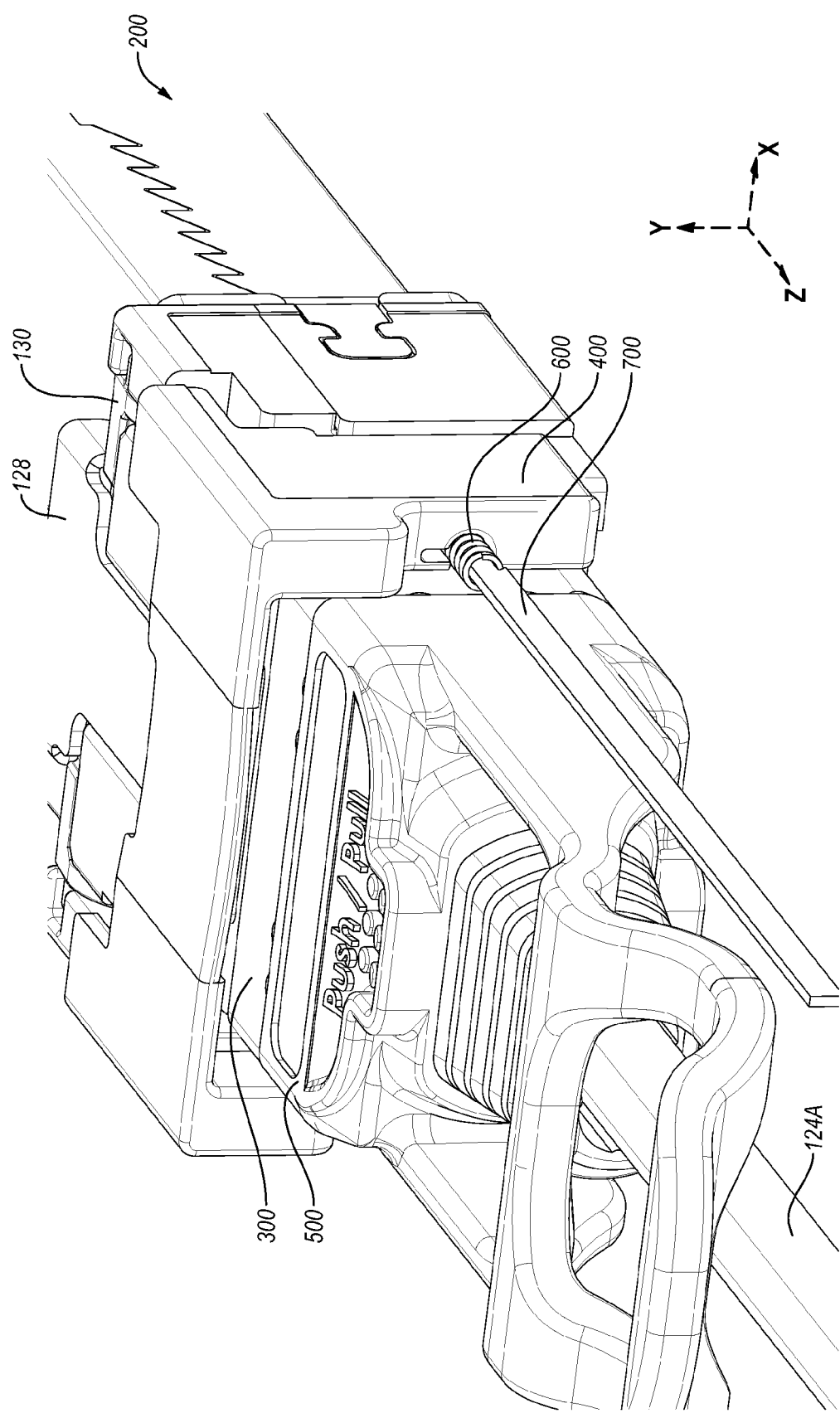

FIGS. 2A and 2B illustrate a front perspective view and an exploded front perspective view, respectively, of an example biasing assembly 200. The biasing assembly 200 may be implemented in a communication module such as the module 100 of FIGS. 1A-1C. A broad overview of the biasing assembly 200 will be provided with respect to FIGS. 2A and 2B before explaining some components included therein with greater detail below with respect to FIGS. 3A-7B.

Briefly, the biasing assembly 200 may include a slider 300 that may be operably connected to a cam 130 and may be configured to cause the cam 130 to rotate about an axis of rotation. The slider 300 provides a feature against which springs 600 abut. Although not shown, in some embodiments, the slider 300 includes an extension, protrusion, handle, or other element that can be manipulated by a user to activate the slider 300. In the illustrated embodiment and other embodiments, however, a boot 500 is operably connected to the slider 300 and the boot 500 includes a handle that can be manipulated by a user to activate the slider 300. As used herein, manipulation by a user of a structure and variations thereof refer to the user gripping, grasping, squeezing, pulling, pushing, or otherwise applying a force to the structure.

A latch cover 400 may be configured to at least partially constrain an end of a latch 128 when the latch 128 is operated. The latch cover 400 may be further configured to attach to a shell of a communication module such as the shell 102 of FIGS. 1A-1C.

The springs 600 are sized to fit between the slider 300 and the latch cover 400. As best illustrated in FIG. 2A, the springs 600 may also be sized such that the springs 600 can fit within a spring opening defined in the latch cover 400. Additionally or alternatively, the material and configuration of the springs 600 may be selected to provide a sufficient spring return force to maintain and return the latching mechanism 140 to a non-activated position (discussed elsewhere herein).

The spring guide 700 which is optionally included in the biasing assembly 200 is also illustrated in FIGS. 2A and 2B. The spring guide 700 may allow installation of the springs 600 through the latch cover 400 and against the slider 300 and after installation may be stored elsewhere for later de-installation and/or installation of the springs 600 in the same or another communication module, and/or may be removed from the biasing assembly 200, set aside, discarded, and/or otherwise omitted during post-installation operation of the biasing assembly 200. In alternative embodiments, the spring guide 700 may take various geometric dimensions, may be incorporated in a machine, or omitted entirely.

Figure 3A:
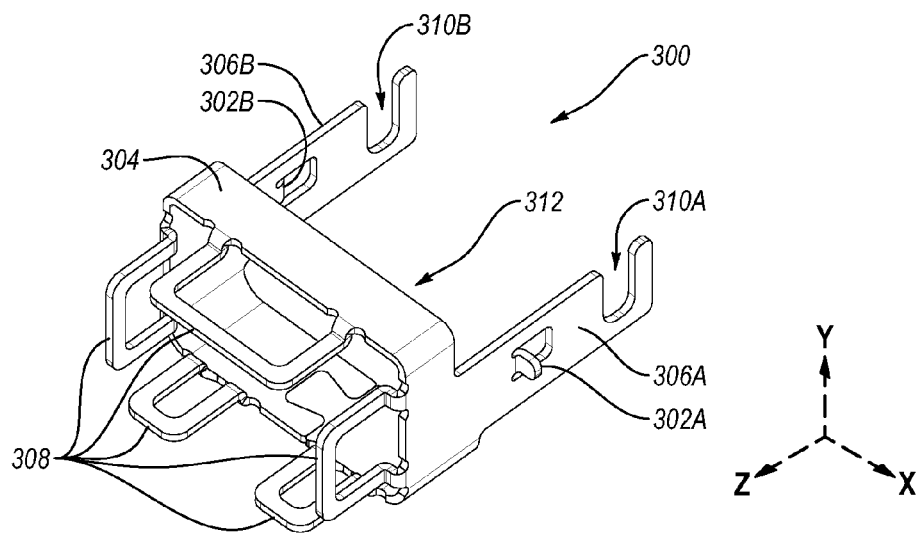
FIGS. 3A-3B illustrate an example slider that may be implemented in the biasing assembly of FIGS. 2A-2B.
Figure 3B:
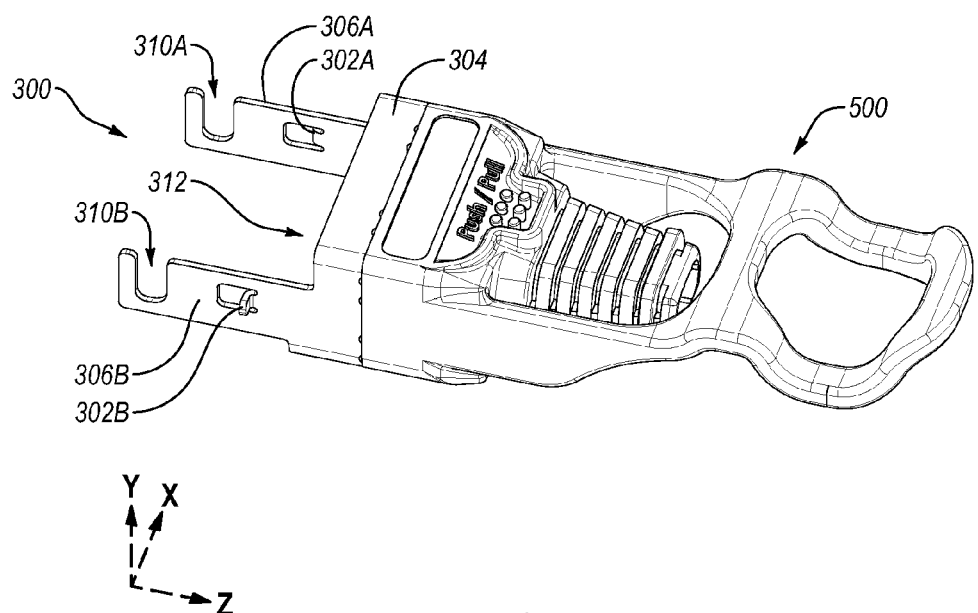

FIGS. 3A and 3B illustrate an example slider 300 that may be included in the biasing assembly 200 of FIGS. 2A-2B. The slider 300 can be made of sheet metal, other metal(s), plastic, other suitable material(s), or any combination thereof. Functionally, the slider 300 may be configured to activate a latching mechanism such as the latching mechanism 140 of FIGS. 1A-1C.

Specifically, as used herein, the terms "activation of the slider 300" and variations thereof refer to the direct or indirect application of a force on the slider 300 that causes the slider 300 to move in the arbitrarily defined z-direction with respect to a shell of a module in which a latching mechanism is implemented. With combined reference to FIGS. 1A, 3A, and 3B, activation of the slider 300 may refer to application of a force on the slider 300 that causes the slider 300 to be moved in the positive z direction of FIG. 1A.

Referring back to FIGS. 3A and 3B, the slider 300 may include a main body 304 having a first end and a second end. The slider 300 further includes arms 306A and 306B (generically, 306) extending from the first end of the main body 304 and one or more coupling structures 308 extending from the second end of the main body 304. Each arm 306A and 306B may include a cutout 310A and 310B (generically, 310) and a stopper feature 302A and 302B (generically, 302). Notably in U.S. Pat. No. 8,391,667 similar features to the stopper features 302 are referred to as "spring tabs."

In this and other embodiments, the slider 300 includes two arms, 306A and 306B, both of which extend from the first side of the main body 304. In alternative embodiments, the slider 300 may include multiple arms 306 that extend from the main body 304. Additionally, in this and other embodiments each arm 306 includes a stopper feature 302 and a cutout 310. For example, arm 306A includes stopper feature 302A and cutout 310A. However, in alternative embodiments, only one arm 306 such as arm 306A may include a stopper feature 302. Likewise, only one arm such as 306B may include a cutout 310. Combining these notions, a slider 300 may include four arms 306, two of which include cutouts 310 and two of which contain stopper features 302. Another example may include a slider 300 with a single arm 306 with both a cutout 310 and a stopper feature 302.

Additionally, in this and other embodiments, the dimensions of the arms 306 may be substantially equivalent. In alternative embodiments, the arms 306 may include one arm 306 that is longer and/or wider than the other arm 306. For example if one arm 306 includes a cutout 310 it may be longer than a second arm 306 which contains a stopper feature 302.

The stopper features 302 are configured to be engaged by springs such as the springs 600 of FIGS. 2A and 2B. Additionally, the springs are configured to press against the stopper feature 302 when manipulated by the user.

The main body 304 of the slider 300 defines a rounded-rectangular opening 312 having an internal volume through which a cable structure such as the cable assembly 124 of FIGS. 1A-1C may pass. In alternative embodiments, the main body 304 may have another shape including but not limited to a circular, a polygonal, or a triangular shape.

The stopper features 302 may extend normally from a surface of a corresponding one of the arms 306. The surface of each of the arms 306 may correspond to and may be continuous with one of the surfaces of the main body 304. Additionally or alternatively, each of the stopper features 302 may extend at an acute or obtuse angle from the surface of corresponding one of the arms 306 and/or may consist of two or more individual segments.

Each of the stopper features 302 may be composed of the same material as the arms 306. In some embodiments, for example, the stopper features 302 may be constructed through a process where a portion of each of the arms 306 is cut and/or punched from the arm 306 and then bent to create the corresponding one of the stopper features 302 that is substantially normal to the arm 306. The process may leave holes on the arms 306 corresponding to the stopper features 302. Alternatively or additionally, the stopper features 302 may be formed separately and adhered to the corresponding arm 306 or may be made through any suitable method.

The slider 300 may also include the cutouts 310. The cutouts 310 are configured to receive and engage a cam. With combined reference to FIGS. 2B, 3A, and 3B, activation of the slider 300 may cause the cam 130 to rotate which may lift the latch 128 as more fully described in U.S. Pat. No. 8,391,667.

Referring back to FIGS. 3A and 3B, the slider 300 also includes the coupling structures 308 which may be configured to operably connect the slider 300 to the boot 500. Referring to FIG. 3B, the boot 500 and the slider 300 are depicted in a connected or coupled configuration. In more detail, a portion of the boot 500 may be over-molded on the coupling structures 308 in some embodiments. In other embodiments, the boot 500 may be connected to the coupling structures 308 using other techniques that include, for example, the use of adhesives and/or elements in the boot 500 that interlock with the coupling structures 308 of the slider 300.

In this and other examples where the slider 300 is connected to the boot 500, the slider 300 can be activated by a user applying a force to the boot 500 in the z-direction. The force applied by the user need not be directed entirely in the z-direction so long as the force results in a force acting on the slider 300 that has a "z" component.

In some embodiments, the slider 300 is activated by a user applying a force directly to the slider 300, rather than indirect application of the force on the slider 300 via the boot 500. In these and other embodiments, the boot 500 may be omitted such that the user manipulates an extension, protrusion, handle, or other element integrally formed to the slider 300 to directly apply a force on the slider 300.

Figure 5A:
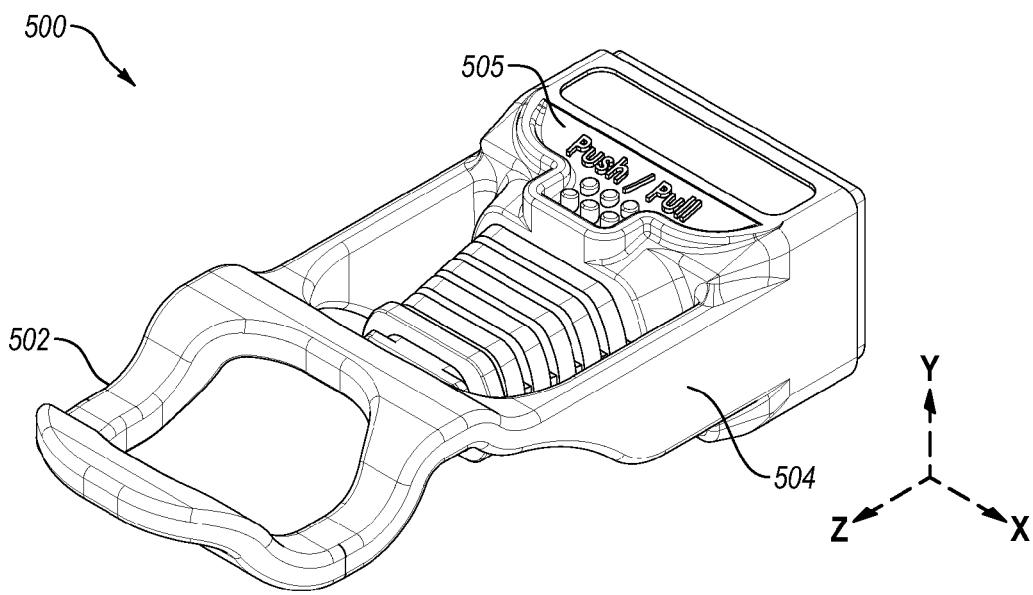
FIGS. 5A-5B illustrate an example boot that may be implemented in the biasing assembly of FIGS. 2A-2B.
Figure 5B:
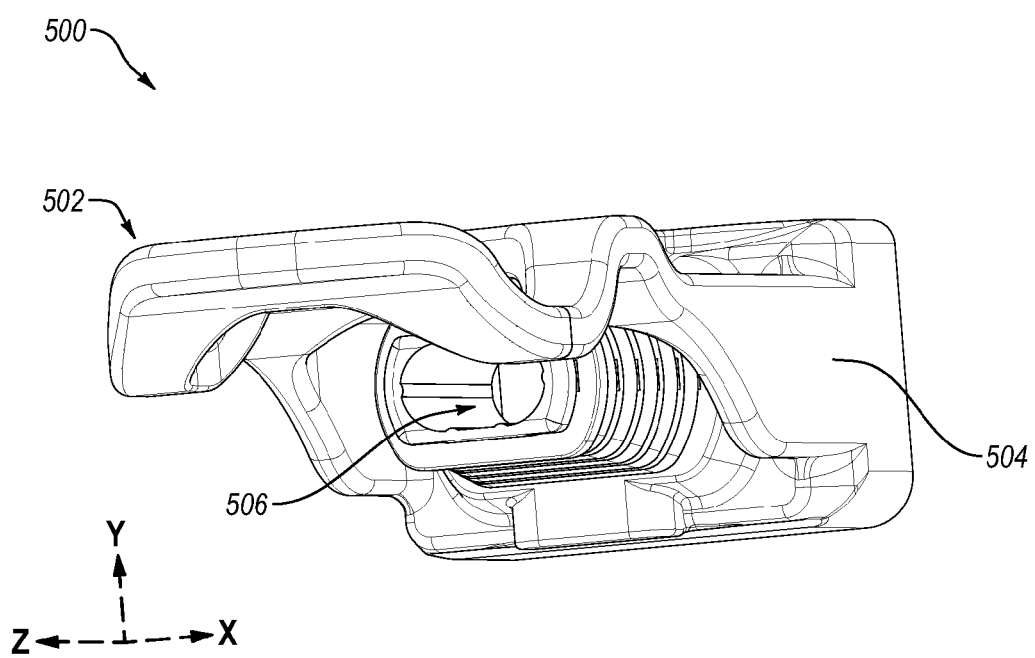

FIGS. 5A and 5B illustrate an example boot 500 that may be implemented in the biasing assembly 200 of FIGS. 2A-2B. The boot 500 can be made of rubber, plastic, sheet metal, other suitable material(s), or any combination thereof. As already explained above, the boot 500 may be operatively connected to the slider 300 such that a user can activate the slider 300 by applying a force in the z-direction to the boot 500. Accordingly, the boot 500 may include a handle 502 that is configured to be manipulated by a user for applying the force to the boot 500.

Alternately, the user may manipulate a main body 504 of the boot 500 or a gripping portion 505 to apply the force to the boot 500, rather than manipulating the handle 502. Optionally, the gripping portion 505 includes one or more corrugations, dimples, protrusions, or any combination thereof. In some examples, the handle 502 is partially or completely omitted from the boot 500.

As best seen in FIG. 5B, the boot 500 may define a cavity 506 in the main body 504. With combined reference to FIGS. 1C and 5B, the cavity 506 may be configured to permit the cable assembly 124 to pass into the module 100.

FIGS. 4A-4D illustrate an example latch cover 400 that may be implemented in the biasing assembly 200 of FIGS. 2A-2B. Notably, the latch cover 400 is referred to in U.S. Pat. No. 8,391,667 as the "retaining cover." Variations between the present application and U.S. Pat. No. 8,391,667 in the name or any name assigned to substantially equivalent components have been made for convenience in drafting the present application and should not be construed to limit the embodiments described herein in any way.

In some embodiments, the latch cover 400 may be composed of plastic, die cast metal, other suitable material(s), or any combination thereof. The latch cover 400 may include a top section 402. With combined reference to FIGS. 2A, 2B, 4A, and 4B, the latch cover 400 is configured to exert a downward (i.e., negative y-direction) force on the latch 128 to secure the latch 128 to the module 100. Additionally, the top section 402 may exert a downward force on the latch 128 to secure and/or bias the latch 128. For example, when the slider 300 is activated, the cam 130 is rotated and the latch 128 is lifted. In this configuration, the latch 128 pushes upwards on the top section 402. When the slider 300 is released, the top section 402 may push downward on the latch 128 to cause the latch 128 to snap into place and engage a corresponding structure of a receptacle.

The latch cover 400 may be also configured to secure a top shell and a bottom shell of a communication module together. To this end, the latch cover 400 may include the one or more side members 408 arranged substantially normal to the top section 402. Generally, the side members 408 may be configured to extend over a shell of a communication module. For example, with combined reference to FIGS. 1A, 1B, 4A, and 4B, the latch cover 400 partially surrounds the positive z-end of the top shell 104 and bottom shell 106, thereby securing the top shell 104 and bottom shell 106 together.

Figure 4A:
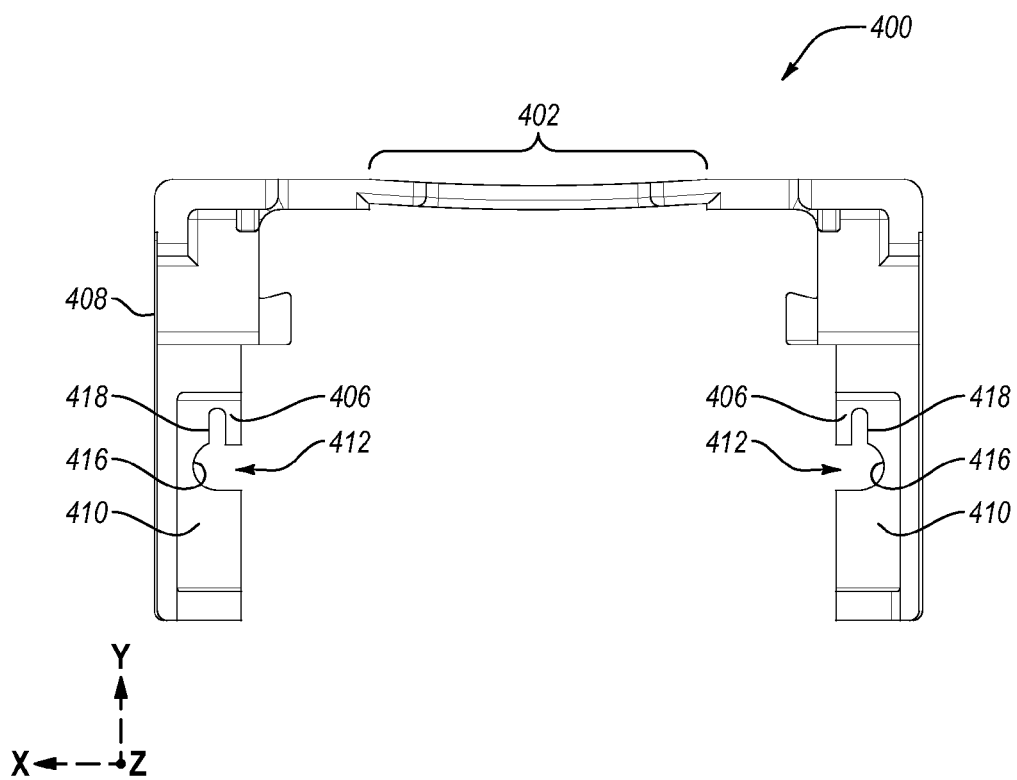
FIGS. 4A-4D illustrate an example latch cover that may be implemented in the biasing assembly of FIGS. 2A-2B.
Figure 4B:
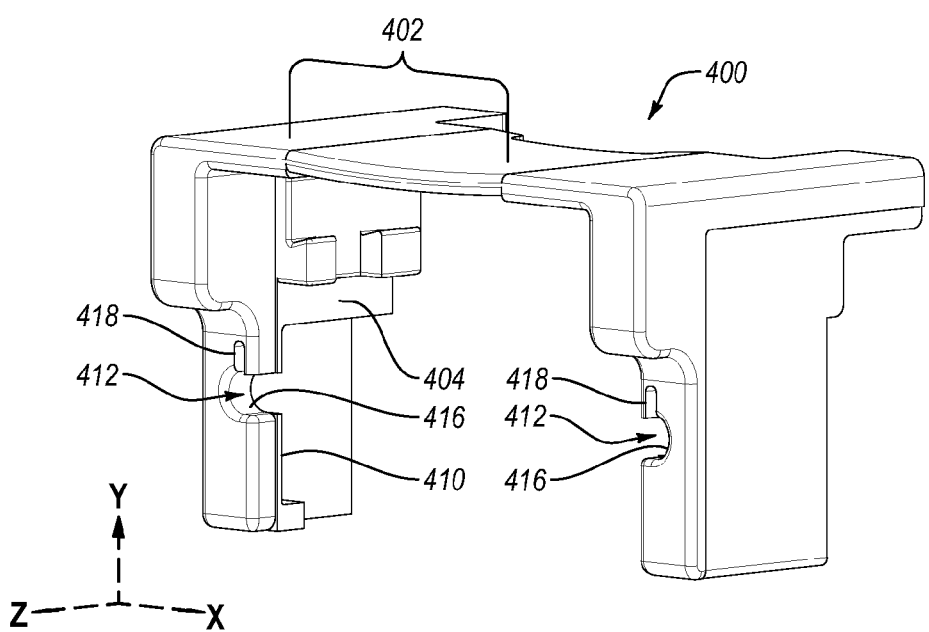
Figure 4C:
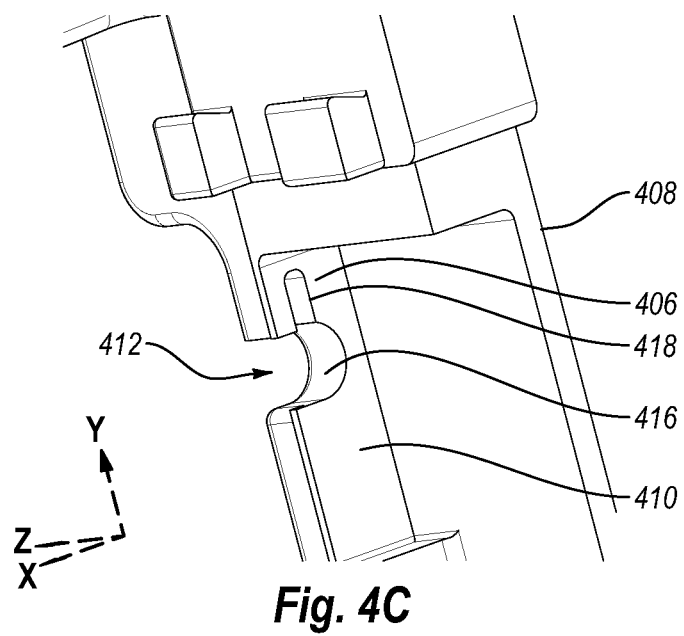

With specific reference to FIGS. 4A and 4C, located on an interior surface 410 of the side members 408, the latch cover 400 may include one or more spring-end contact regions 406. The spring-end contact regions 406 may be an accumulation of material or alternatively a depression sized to receive a spring end (described below). The spring-end contact regions 406 may substantially align with stopper features. For example, with combined reference to FIGS. 3A-4C, the spring-end contact regions 406 may align with stopper features 302 of the slider 300. With this configuration, one or more springs may be positioned such that a first spring end of each spring abuts a corresponding spring-end contact region 406 on the latch cover 400 and a second spring end of each spring abuts the corresponding stopper feature 302.

Additionally or alternatively, the latch cover 400 may include one or more inverse cover spring shoulders 404. The inverse cover spring shoulders 404 may constrain a spring in the x and/or y directions when the spring is positioned between one spring end contact region 406 and one stopper feature 302. Additionally or alternatively, the spring may be further constrained by one or more inverse module spring shoulders included in the shell of the module. For example, referring to FIG. 1C, inverse module spring shoulders 106A and 106B may be configured to constrain the spring in the x and/or y directions.

Thus, with combined reference to FIGS. 1C, 2B, 3A, and 4A-4C, in some embodiments, the springs 600 may be constrained in the z direction by the spring-end contact regions 406 and the stopper features 302. Additionally, the springs 600 may be constrained in the x and y directions by the inverse cover spring shoulders 404 and the inverse module spring shoulder 106A or 106B. In this configuration, when the slider 300 is activated, that is moved in substantially the z-direction, the springs 600 may be compressed between a corresponding one of the stopper features 302 and a corresponding one of the spring-end contact regions 406. The compression of each spring 600 may result in a spring return force (discussed below) that acts to return the spring 600 to its original length or least compressed length, thereby moving the slider 300 back to an un-activated position.

Referring back to FIGS. 4A-4D, the latch cover 400 may include spring openings 412 defined in the side members 408. Generally, each of the spring openings 412 allows a corresponding spring to be inserted through the latch cover 400 and against a corresponding stopper feature 302.

Figure 4D:
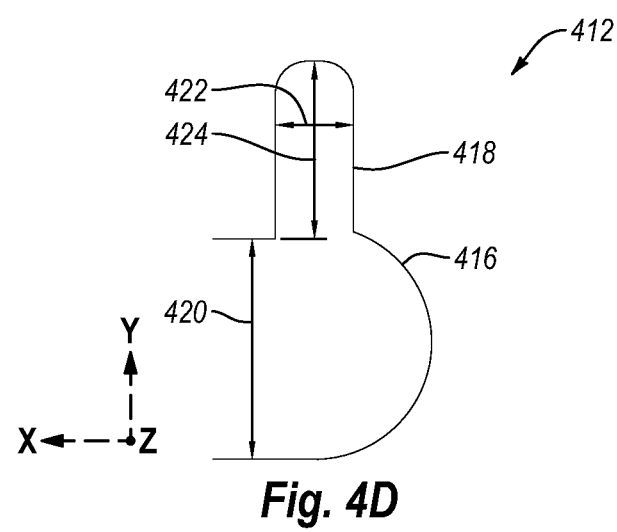

Each of the spring openings 412 may take various shapes including by not limited to a cylinder, a prism, a cube, a rectangular prism, a parallelepiped, or some portion of an ellipsoid, a pyramid, a cone, or a tetrahedron or combination thereof. In some embodiments, each of the spring openings 412 includes an insertion hole 416 and an extraction slot 418. As best illustrated in FIGS. 4C and 4D, the insertion hole 416 may have a cross-section including a circular area that is extended in the positive x-direction. That is, the insertion hole 416 may include a substantially cylindrical opening. The cylindrical opening may be extended in the positive x-direction until exiting the side member 408. The result is an arc on the right side (negative x-direction) of the insertion hole 416. On the left side (positive x-direction), the insertion hole 416 includes a substantially rectangular area with lateral or horizontal sections on the top (greatest y-direction dimension of the insertion hole 416) and bottom (lowest y-direction dimension of the insertion hole 416).

A circular area diameter 420 may be sized to accommodate a spring diameter of a spring. The circular area diameter 420 may also be the dimension between the lateral or horizontal sections of the rectangular area in the y-direction. Additionally or alternatively, the circular area diameter 420 may be greater than the spring diameter of the spring.

Each spring opening 412 may include an extraction slot 418. The extraction slot 418 may extend in the positive y-direction from the insertion hole 416. As in the embodiments depicted in FIGS. 4A-4D, the extraction slot 418 and the insertion hole 416 may be or combine to form a single opening (e.g., the spring opening 412) defined in the side member 408.

Additionally or alternatively, as best illustrated in FIG. 4C, the spring opening 412 defined in the side member 408 may leave the interior surface 410 flat. Accordingly, in this and other embodiments, the spring-end contact region 406 may include an area on the internal surface 410 surrounding the extraction slot 418.

In alternative embodiments, the interior surface 410 may include the extraction slot 418 along with a spring-end contact region 406 which may be an accumulation of material or alternatively a depression which is sized to receive a spring end. Alternatively or additionally, the extraction slot 418 may be oriented differently with respect to the insertion hole 416 or form an independent or optionally independent opening such as being separated by a pivoting section of material.

The extraction slot 418 illustrated in FIGS. 4C-4D has a rectangular shape including a slot width 422 (the x-dimension) and a slot height 424 (the y-dimension). The slot width 422 and the slot height 424 may be sized to prevent retraction of a spring through the latch cover 400. Alternatively or additionally, the slot width 422 and the slot height 424 may be sized to correspond to a spring guide as discussed below with respect to FIGS. 7A-7B. Additionally or alternatively, the extraction slot 418 may have chamfered or rounded dimensions.

Figure 6B:
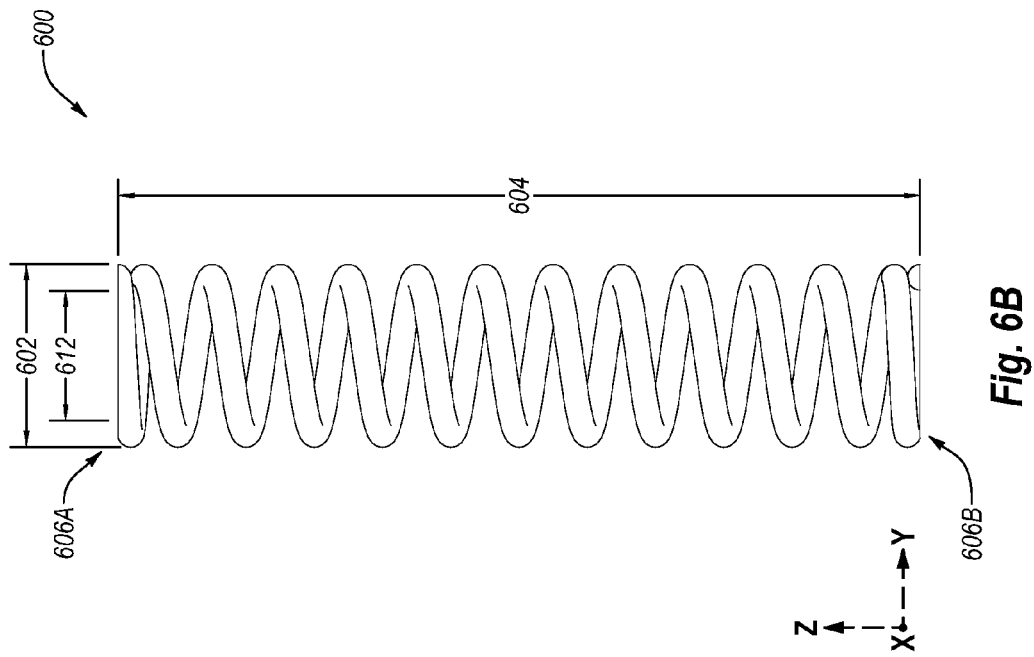
FIGS. 6A-6B illustrate an example spring that may be implemented in the biasing assembly of FIGS. 2A-2B.
Figure 6A:
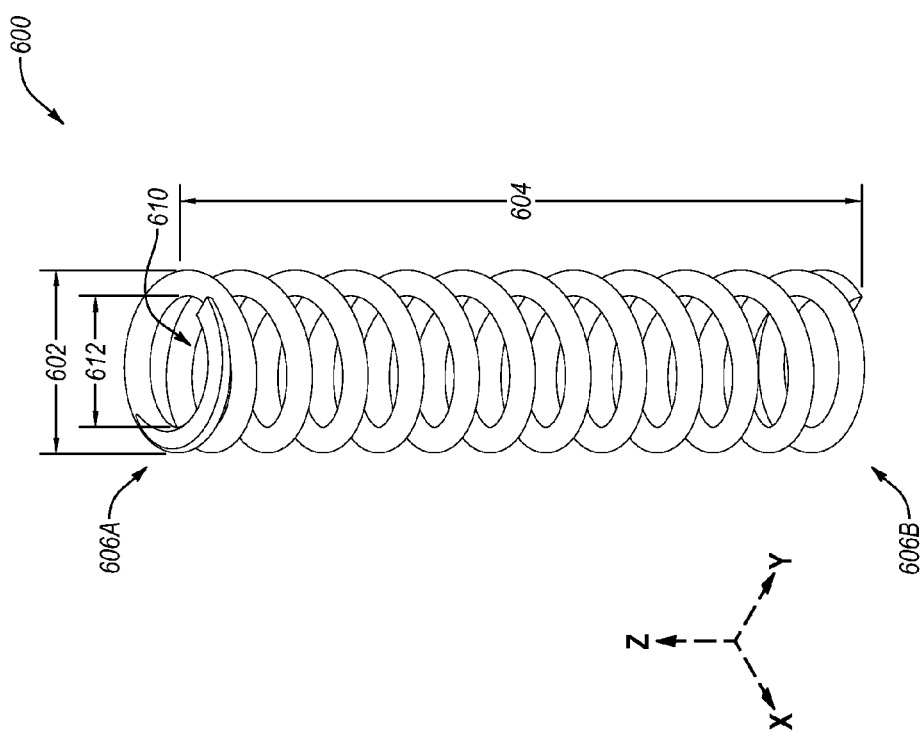

FIGS. 6A-6B illustrate an example of the springs 600 that may be implemented in the biasing assembly 200 of FIGS. 2A-2B. The springs 600 can be made of rubber, plastic, coil wire, other suitable material(s), or any combination thereof. As illustrated in FIG. 6A, the spring 600 may be a cylindrical compression spring. However, in alternative embodiments, each of the springs 600 may include, but is not limited to, a microspring, a conical compression spring, an extension spring, a torsion spring, a constant force spring, or equivalent device(s).

Each of the springs 600 has a spring diameter 602 and spring lengths. A first spring length is an unloaded spring length 604. The unloaded spring length 604 refers to the spring length when the spring 600 is not compressed or extended and thus not storing compressive energy. The spring 600 may have additional spring lengths depending on the load applied to the spring 600.

Additionally, the spring 600 in the illustrated embodiment of FIGS. 6A-6B may be made up of multiple coils which extend circumferentially around an internal spring volume 610. The internal spring volume 610 may be the volume confined by the coils and may be essentially a cylinder with an internal spring diameter 612 and an internal length which is equivalent to the spring length of the spring 600. For example, when the spring 600 is not compressed, the internal length is equal to the unloaded spring length 604.

Additionally, as shown in FIG. 6B, the spring 600 has two spring ends, 606A and 606B (generically, 606). Each spring end 606 includes one or more coils where the spring 600 terminates. Each spring end 606 is substantially circular but this dimension may vary with the dimension of the spring 600. Throughout, the spring ends 606 may be referred to as a first spring end and a second spring end. In the depicted embodiment, these designations are arbitrarily assigned.

FIGS. 7A-7B illustrate an example spring guide 700 that may be implemented in the biasing assembly 200 of FIGS. 2A-2B. The spring guide 700 can be made of rubber, plastic, sheet metal, or any other suitable material(s), or any combination thereof. As illustrated in FIG. 7A, the spring guide 700 may include a guide body 702, a spring retainer 704, and a spring carrier 706.

The guide body 702 may be rectangular, may include different curved sections, or may be attached to a machine or an automated system that controls the movement of the spring guide 700. The guide body 702 further includes a guide width 708 (the x-dimension in FIG. 7A) and a guide height 710 (the y-dimension in FIG. 7A). With combined reference to FIGS. 4A-4D and 7A-7B, the guide width 708 may be sized to correspond with the slot width 422 of the extraction slot 418.

Likewise, the guide height 710 may be sized to correspond with the slot height 424. The guide width 708 and the guide height 710 may generally be smaller than the slot height 424 and the slot width 422. The difference between the guide width 708 and the slot width 422 and between the guide height 710 and the slot height 424 may be sufficient to ensure the spring guide 700 does not interfere with the extraction slot 418 given manufacturing tolerances of the spring guide 700 and the latch cover 400.

As illustrated in FIGS. 7A and 7B, the spring guide 700 may include the spring carrier 706. The spring carrier 706 may include a portion of the spring guide 700. In alternative embodiments, the spring carrier 706 may be attached to the guide body 702 through adhesion and/or fastened to allow replacement of this portion of the spring guide 700, for instance.

The spring carrier 706 is largely identical to the guide body 702 except that a carrier height 712 (the y-dimension in FIG. 7A) is generally smaller than the guide height 710. With combined reference to FIGS. 6A and 7A-7B, the carrier height 712 may correspond to the internal spring diameter 612. The carrier height 712 allows a spring 600 to be inserted onto the spring guide 700 with the spring carrier 706 extending into the internal spring volume 610 as illustrated in FIG. 7B. In some embodiments the dimensions of the spring 600, the internal volume 610, and the carrier height 712 may allow for an interference fit between the spring 600 and the spring carrier 706.

Additionally, the spring carrier 706 includes a dimension in the z-direction which runs from an end of the spring guide 700 to the spring retainer 704, hereinafter referred to as a carrier length 714. As best shown in FIG. 7B, the carrier length 714 may be sized such that when a spring 600 is placed on the spring guide 700, the spring carrier 706 extends only partially into the internal spring volume 610. This allows the spring 600 to compress in the z-direction when placed against an object such as a stopper feature.

The spring carrier 706 extends from the end of the spring guide 700 to the spring retainer 704. The spring retainer 704 is essentially a shoulder 718 created by the reduction in physical dimensions between the guide height 710 and the carrier height 712. When the spring 600 is placed on the spring guide 700, a spring end 606 abuts the spring retainer 704.

As illustrated in FIG. 7B, the spring retainer 704 may also include a spring hook 716 which may be triangular or a curved triangle that extends from the shoulder 718. The shoulder 718 and the spring hook 716 may prevent the spring 600 from moving up (in the positive z-direction) the guide body 702. Additionally, the spring hook 716 and the shoulder 718 may position the spring 600 on the spring carrier 706. For example, if the internal spring diameter 612 is much greater than the carrier height 712, the spring 600 may be forced into the spring hook 716 to ensure the spring 600 maintains a given position.

Alternatively, the spring guide 700 may have a gradually varying height dimension which performs the same function as the spring retainer 704. In an alternative embodiment, the spring guide 700 may include two or more spring retainers 704, such as a top spring retainer (the furthest y-dimension), one or more side spring retainers (positioned on a surface of the spring guide 700), and a bottom spring retainer (as illustrated in FIG. 7A). In yet another alternative embodiment, the spring retainer 704 may include a variety of shoulders 718 and spring hooks 716. For example, a spring guide 700 may include two spring retainers 704. The top spring retainer 704 having only a shoulder 718 and the bottom spring retainer 704 having only a spring hook 716. Any combination of the foregoing may be implemented as desired.

Figure 8A:
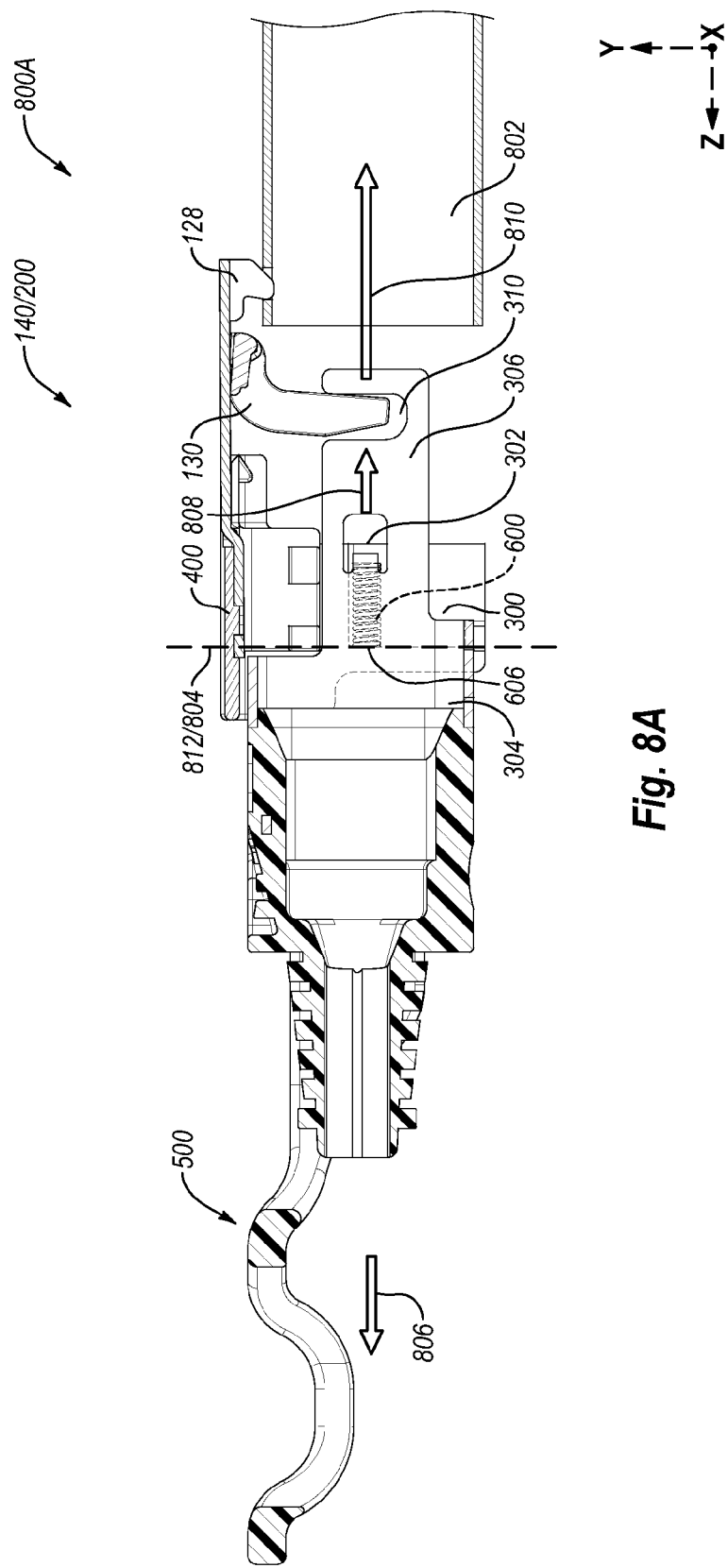
FIG. 8A illustrates a cross-sectional view of the communication module of FIGS. 1A-1C with the biasing assembly of FIGS. 2A-2B in a non-activated position.
Figure 8B:
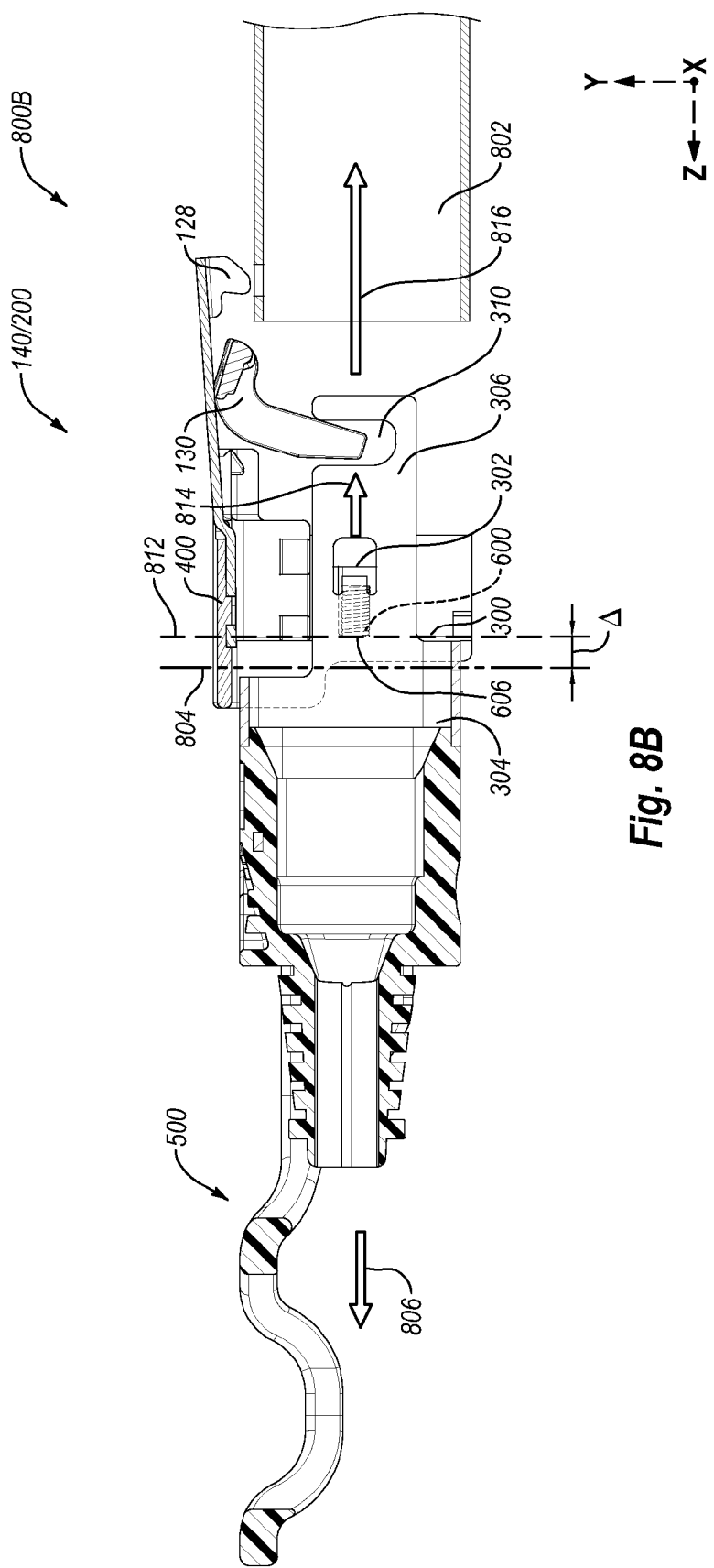
FIG. 8B illustrates a cross-sectional view of the communication module of FIGS. 1A-1C with the biasing assembly of FIGS. 2A-2B in an active position.

Turning next to FIGS. 8A and 8B, additional details regarding the operation of the biasing assembly 200 are disclosed. Specifically, FIG. 8A illustrates a cross-sectional view of the module 100 of FIGS. 1A-1C with the biasing assembly 200 of FIGS. 2A-2B in a non-activated position 800A. FIG. 8B illustrates a cross-sectional view of the module 100 of FIGS. 1A-1C with the biasing assembly 200 of FIGS. 2A-2B in an activated position 800B.

To describe the non-activated position 800A and the activated position 800B, a set of forces are represented in FIGS. 8A and 8B. The set of forces act in substantially the arbitrarily designated z-direction and may include a manipulation force 806 which acts in the positive z-direction; and a cam force 810 (FIG. 8A), a second cam force 816 (FIG. 8B), a spring force 808 (FIG. 8A), and a spring return force 814 (FIG. 8B) which act in the negative z-direction.

Referring to FIG. 8A, the manipulation force 806 may result from a user manipulating the slider 300 and/or the boot 500 by applying a force such as a push or a pull to the boot 500 and/or the slider 300 so as to apply a net force, e.g., the manipulation force 806, to the slider 300 in the positive z direction.

The spring force 808 is a force applied by the spring 600 positioned between the stopper feature 302 and the latch cover 400. The spring force 808 acts in substantially the z-direction to maintain the stopper feature 302 of the slider 300 at a specific distance from the latch cover 400.

The cam force 810 represents a z-component of a force applied by the portion of the cam 130 positioned within the cutout 310 against the arm 306 of the slider 300 in the negative z direction. The cam force 810 may result from a downward force (e.g., in the negative y direction) of the flat portion 402 of the latch cover 400 against the latch 128 which may translate to the application by the latch 128 of a torque on the cam 130 so as to rotationally bias the cam 130 in the orientation illustrated in FIG. 8A. The spring force 808 and the cam force 810 may generally cooperate to maintain the slider 300 in the non-activated position 800A of FIG. 8A until a sufficiently large manipulation force 806 is applied.

In FIG. 8A, two arbitrarily positioned reference planes 804, 812 are illustrated as being coplanar. Both of the reference planes 804, 812 coincide in FIG. 8A with a spring end 606 positioned against the interior surface of the latch cover 400. The reference planes 804, 812 are oriented substantially parallel to the x-y plane of FIG. 8A. The reference plane 804 is fixed with respect to the slider 300 and the reference plane 812 is fixed with respect to the latch cover 400. The reference planes 804, 812 will be used in the discussion that follows.

The biasing assembly 200 included in the latching mechanism 140 may be arranged in the non-activated position 800A of FIG. 8A when the manipulation force 806 is insufficient to overcome the spring force 808 and the cam force 810. A common circumstance resulting in the non-activated position 800A is when the manipulation force 806 applied to the boot 500 in substantially the z-direction has been removed. Characteristics of the non-activated position 800A may include the latch 128 engaging the receptacle of a host device 802, the cam 130 rotated to engage the cutout 310 of the slider 300, and the spring 600 at a length which is approximately the unloaded length 604. More generally, the spring 600 may be at a least compressed length given a maximum possible distance between the stopper feature 302 and the spring-end contact region 406 when the module 100 is fully assembled and when the maximum possible distance is less than the unloaded length 604 of the spring 600.

Referring next to FIG. 8B, the activated position 800B is depicted. In the activated position 800B, the manipulating force 806 is sufficient to overcome the spring force (808, FIG. 8A) and the cam force (810, FIG. 8A) thus moving the slider 300 in the positive z direction with respect to the latch cover 400, the latch 128 and the host device 802. In view of the relative movement of the slider 300, the reference plane 804 that is fixed with respect to the slider 300 is displaced in the positive z direction with respect to the reference plane 812 that is fixed with respect to the latch cover 400. In view of the relative movement of the slider 300 in the positive z direction, the first reference plane 804 may be displaced from the second reference plane 812 by a distance $\Delta$ in the activated position 800B of FIG. 8B.

In the activated position 800B, the spring 600 is compressed between the stopper feature 302 and the latch cover 400 creating the spring return force 814 which may be equal to $-k\Delta$ where k is a spring constant dependent on material and construction of the spring 600. The spring return force 814 may act in the z-direction to return the spring 600 to the unloaded spring length 604 (or to the least compressed spring length) after removal of the manipulation force 806, for example. Additionally, when the manipulation force 806 is sufficiently large to displace the slider 300 in the positive z direction by the distance $\Delta$, the cutout 310 of the slider 300 engages the cam 130 which rotates to lift the latch 128 from the receptacle of the host device 802. When the latch 128 is lifted, the latch cover 400 acts against the latch 128 which may translate to the application by the latch 128 of a torque on the cam 130 so as to create the second cam force 816 which represents a z-component of a force applied by the cam 130 against the cutout 310 of the slider 300.

In operation, to move the biasing assembly 200 included in the latching mechanism 140 from the non-activated position 800A to the activated position 800B, the manipulation force 806 may generally be sufficient to overcome the spring force 808 and the cam force 810. Likewise, to maintain the activated position 800B, the manipulation force 806 must be sufficient to overcome the spring return force 814 and the second cam force 816. Once the manipulation force 806 is decreased and insufficient to overcome the spring return force 814 and the second cam force 816, the slider 300 is moved forward (the negative z-direction) to the non-activated position 800A. Thus, the biasing assembly 200 included in the latching mechanism 140 biases the slider 300 in the non-activated position 800A and, when the slider 300 is in the activated position 800B, the biasing assembly 200 acts to return the slider 300 to the non-activated position 800A in response to a removal or a sufficient reduction of the manipulation force 806.

In alternative embodiments, the cam force 810 and the second cam force 816 may be omitted. Additionally or alternatively, the spring force 808 and the spring return force 814 may have a configuration where only some component of the spring force 808 and the spring return force 814 are opposed the manipulation force 806.

Turning next to FIGS. 9A-9H, in combination with the flowchart of FIG. 10, details regarding a method 900 of installing a spring 600 (hereinafter referred to as the "installation method 900") are disclosed. As described with reference to FIGS. 9A-9H and 10, the installation method 900 includes one spring 600. However, this is not meant to be limiting. In some embodiments, the installation method 900 may include multiple springs 600, which may be installed simultaneously using the installation method 900, for example. Specifically, FIGS. 9A-9H illustrate multiple views of the biasing assembly 200 of FIGS. 2A-2B during the installation of the spring 600 of FIGS. 6A-6B and FIG. 10 illustrates a flow diagram of an example method 1000 of installing the spring 600 of FIGS. 6A-6B in the biasing assembly 200 of FIGS. 2A-2B. As an overview, the installation method 900, 1000 generally includes the latch cover 400 being placed in a first position 902A illustrated in FIGS. 9A-9D; then the latch cover 400 is placed in a second position 902B illustrated in FIGS. 9E-9F; then the latch cover 400 is placed in a third position 902C illustrated in FIGS. 9G-9H.

Referring first to FIGS. 9A-9D, initially the latch cover 400 is placed in the first position 902A (1002, FIG. 10). In the first position 902A, the latch cover 400 is positioned such that the insertion hole 416 is substantially aligned with the stopper feature 302. As illustrated, the circular area diameter 420 of FIG. 4D of the insertion hole 416 is sized to correspond to a spring diameter such as the spring diameter 602 of FIG. 6A.

The spring 600 is placed on the spring carrier 706 of the spring guide 700 (1004, FIG. 10). As mentioned above with reference to FIGS. 7A, 7B, 6A, and 6B, the carrier height 712 may correspond to or be complementary to the internal spring diameter 612 to allow the spring carrier 706 to be inserted into the internal spring volume 610 of the spring 600. Also, the carrier length 714 may generally be shorter than the unloaded spring length 604 such that spring carrier 706 only extends to some portion of the internal spring volume 610 of the spring 600 when the spring 600 is unloaded. The spring end 606B of the spring 600 is positioned against the spring hook 704 of the spring guide 700 (1006, FIG. 10).

Figure 9B:
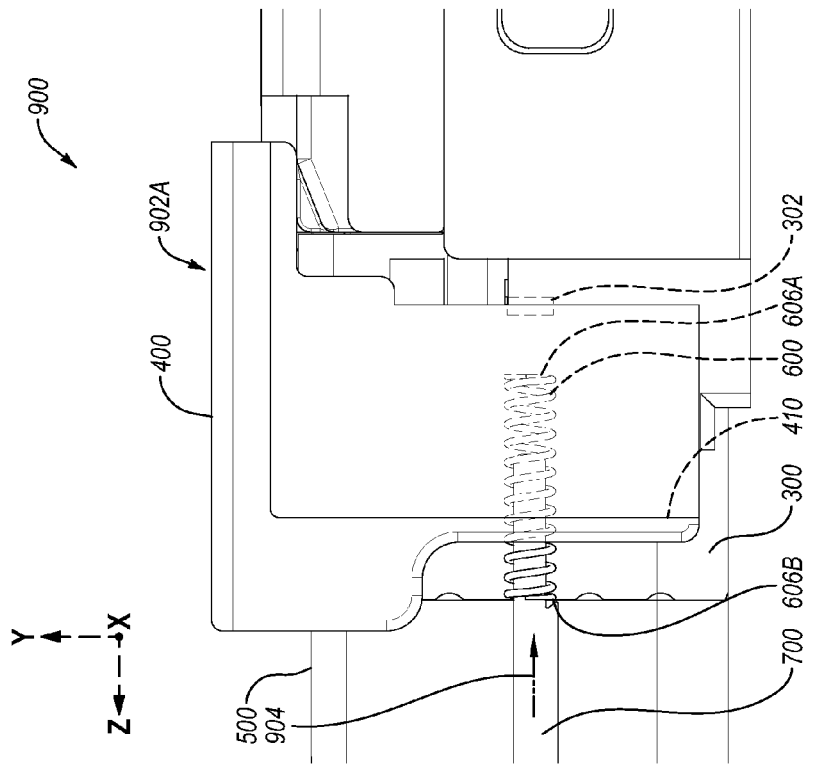
Figure 9A:
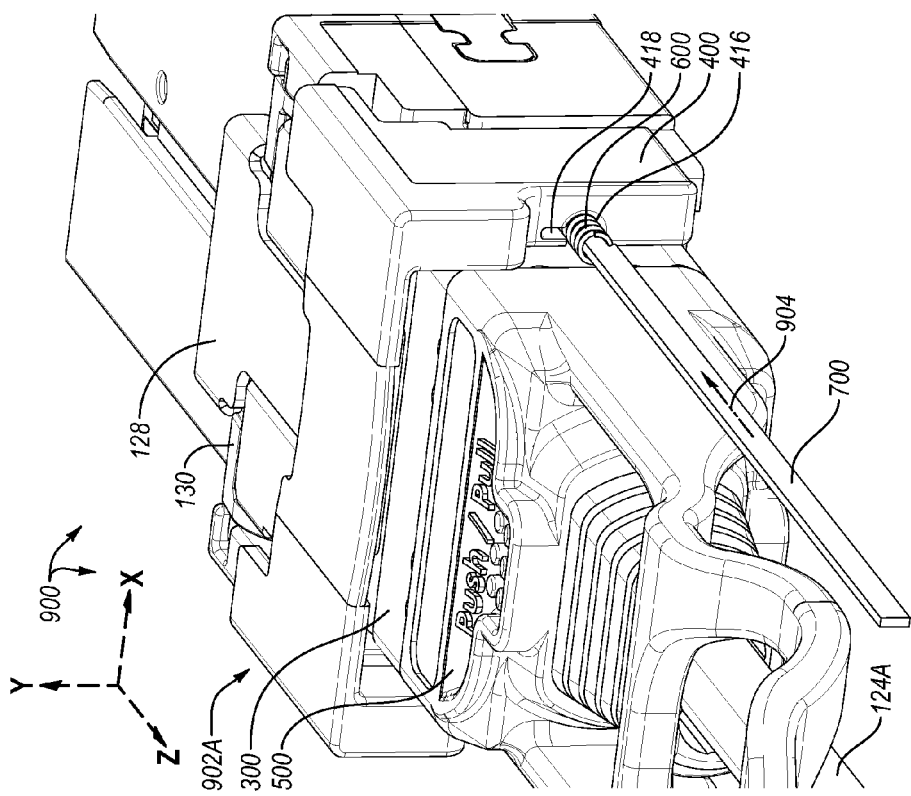
Figure 10:
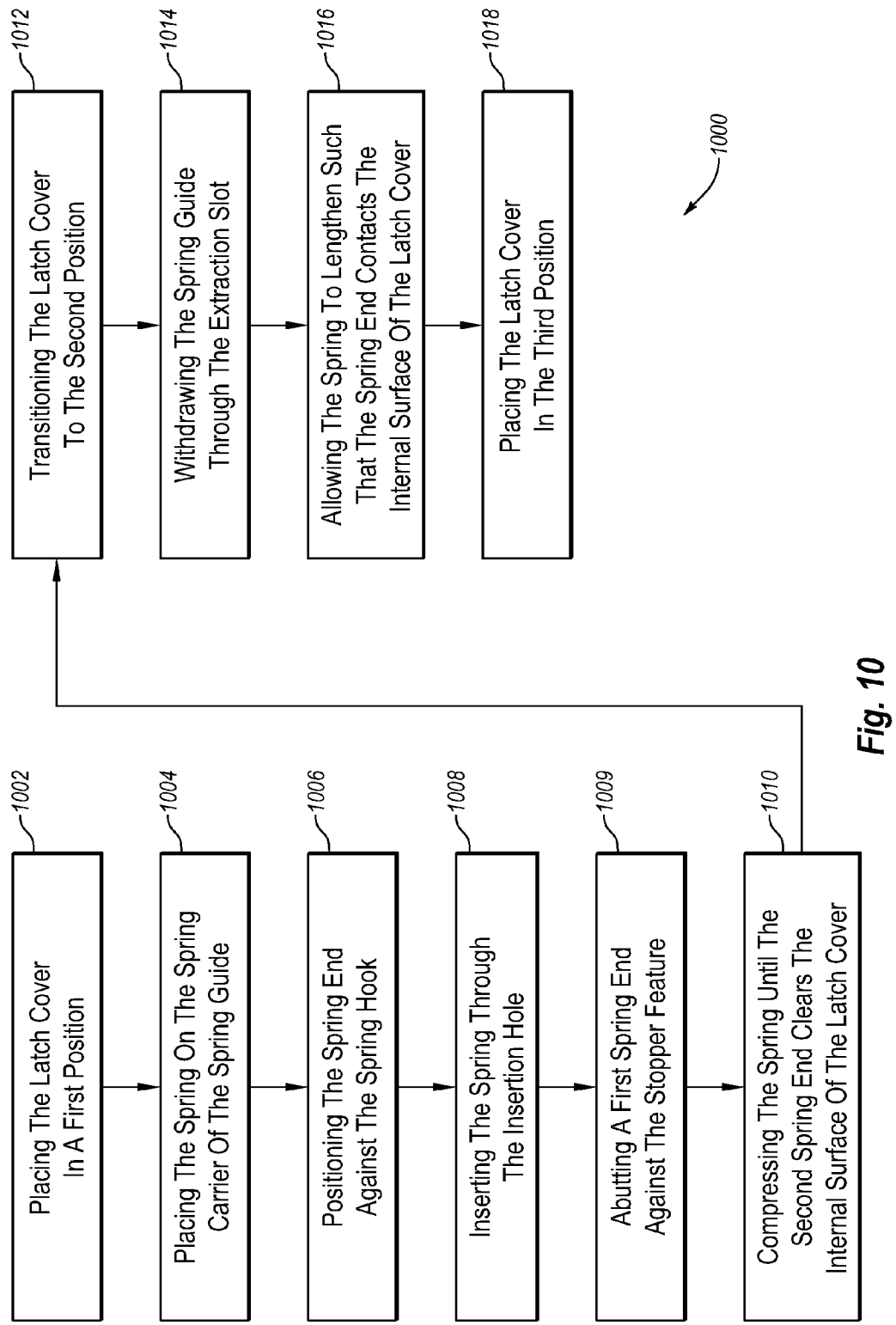
FIG. 10 illustrates a flow diagram of an example method of installing the spring of FIGS. 6A-6B in the biasing assembly of FIGS. 2A-2B.

As illustrated in FIGS. 9A and 9B, while the latch cover 400 is in the first position 902A, the spring 600 placed on the spring guide 700 is inserted through the insertion hole 416 (1008, FIG. 10). The spring 600 moves through the insertion hole 416, such that the first spring end 606A passes the internal surface 410 and is positioned within the latch cover 400. The second spring end 606B is external to the latch cover 400.

As illustrated in FIGS. 9C-9D, the spring 600 is inserted through the insertion hole 416, abutting the first spring end 606A of the spring 600 against the stopper feature 302 (1009, FIG. 10). The spring guide 700 is moved in the z-direction as indicated by the arrow 904 to compress the spring 600 against the stopper feature 302 until the second spring end 606B of the spring 600 positioned against the spring hook 704 clears the internal surface 410 of the latch cover 400 (1010, FIG. 10).

Figure 9F:
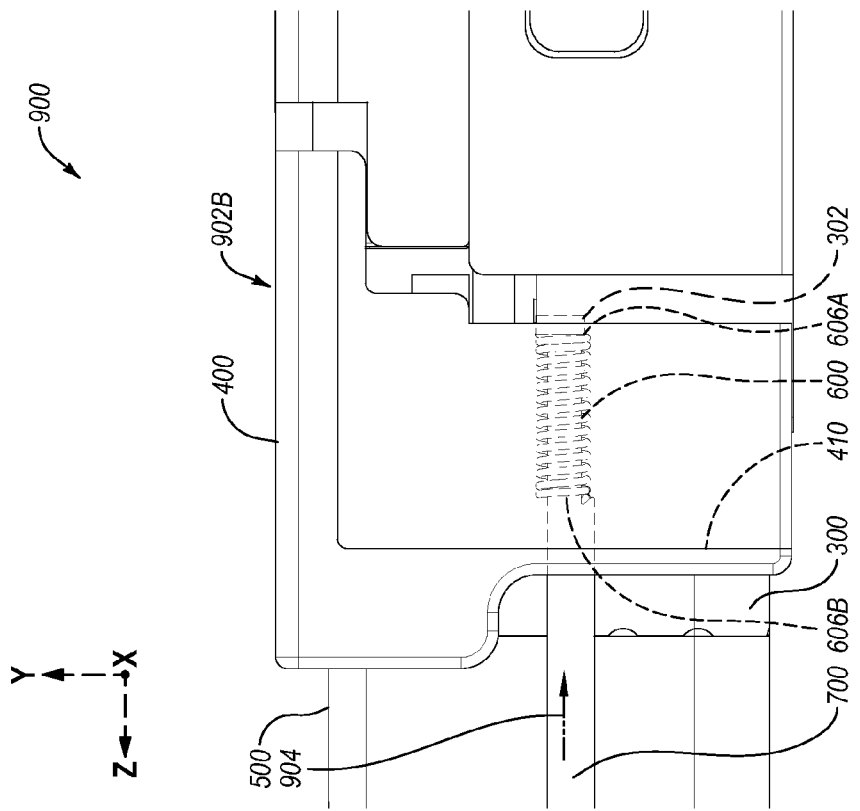
Figure 9E:
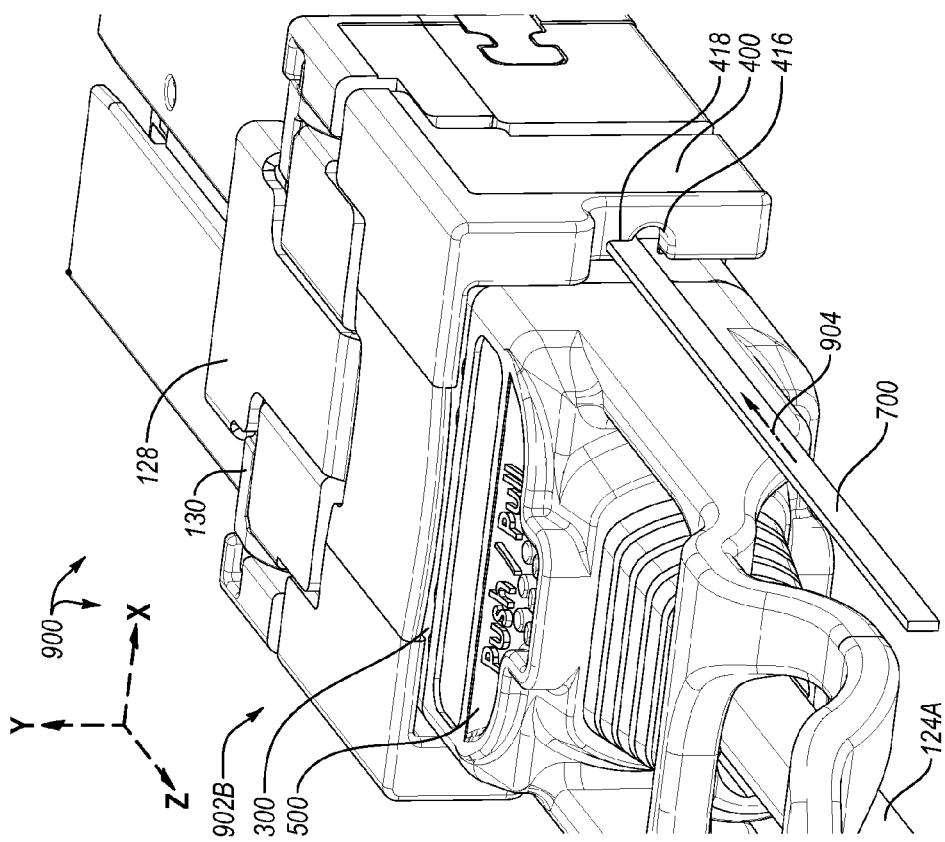

Referring next to FIGS. 9E thru 9F, the latch cover 400 is the transitioned to the second position 902B (1012, FIG. 10). In the embodiment illustrated in FIGS. 9A-9G, the transition to the second position 902B is accomplished by moving the latch cover 400 in the negative y-direction. In alternative embodiments this transition may be accomplished by moving the latch cover 400 in another direction depending on the configuration of the insertion hole 416 and extraction slot 418.

As illustrated in FIGS. 9E and 9F, in the second position 902B, the spring guide 700 is introduced into the extraction slot 418. Again, with combined reference to FIGS. 4D, 7A, and 7B, the slot width 422 is sized to correspond to the guide width 708 and the slot height 424 is sized to correspond to the guide height 710 such that when the latch cover 400 is transitioned to the second position 902B, the spring guide 700 fits into the extraction slot 418. However, slot width 422 and the slot height 424 substantially prevent the retraction of the spring 600 through the latch cover 400. The transition from the first position 902A to the second position 902B positions the spring 600 between the internal surface 410 of the latch cover 400 and the stopper feature 302. In the second position 902B, the first spring end 606A remains abutting the stopper feature 302 and the second spring end 606B remains clear of the internal surface 410.

Figure 9H:
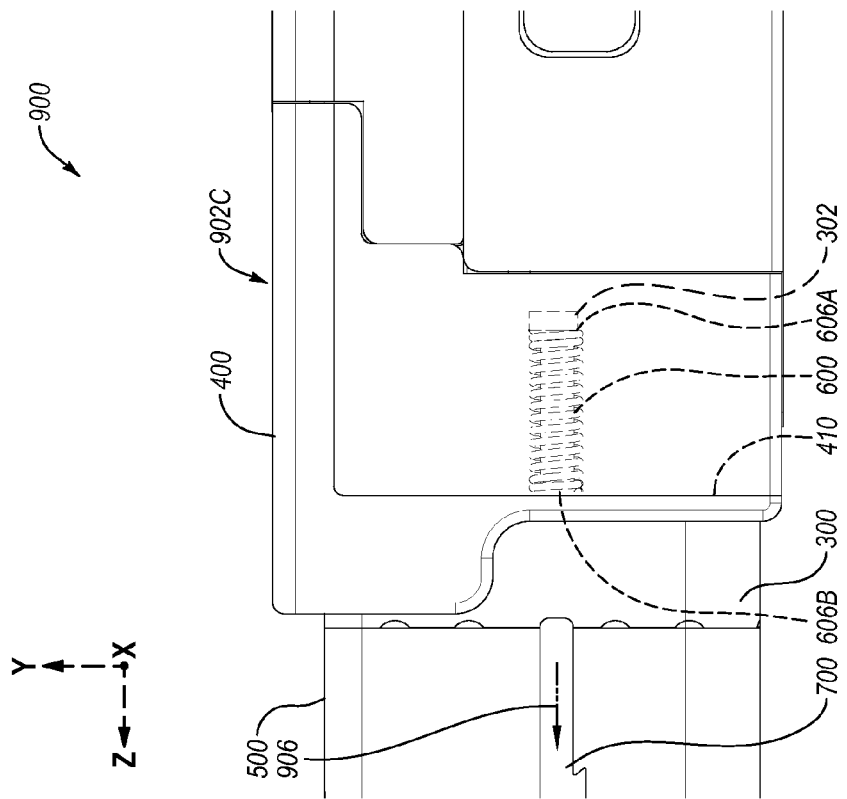
Figure 9G:
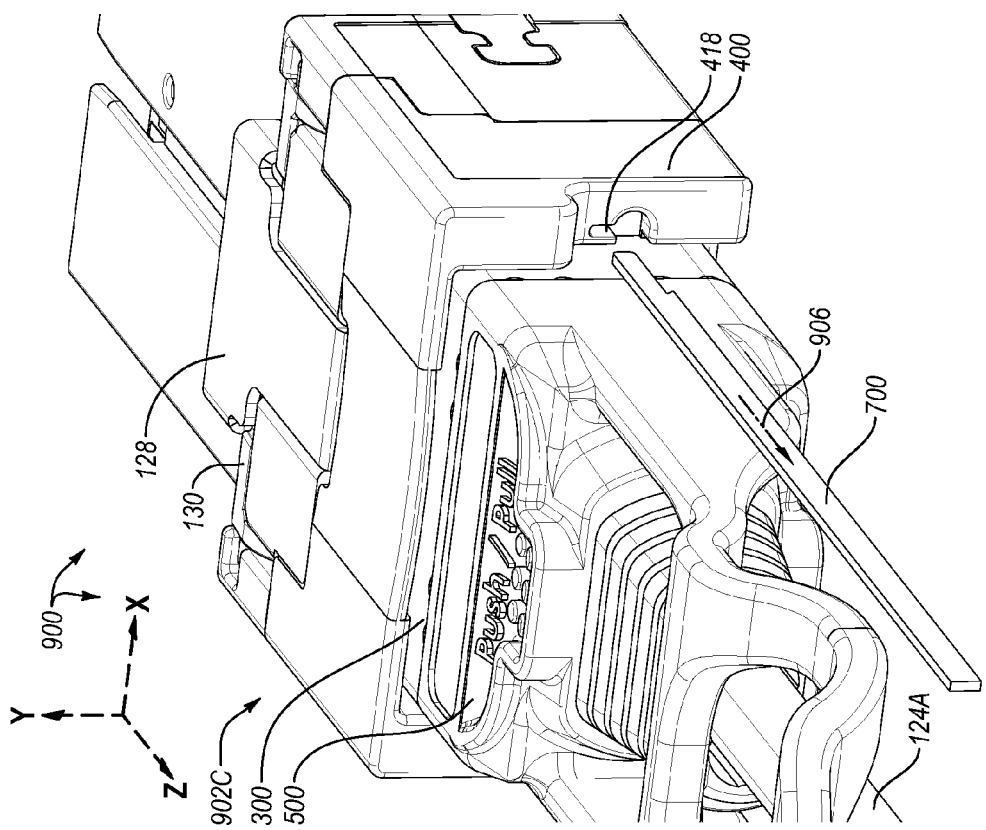

In FIGS. 9G and 9H, the spring guide 700 is withdrawn through the extraction slot 418 (1014, FIG. 10). As shown by arrow 906, the spring guide 700 is withdrawn. The compressed spring 600 extends to abut the second spring end 606B against the internal surface 410 of the latch cover 400 that surrounds the extraction slot 418, thus, capturing the spring 600 between the latch cover 400 and the stopper feature 302 (1016, FIG. 10).

As further illustrated in FIGS. 9G and 9H, the latch cover 400 is placed in a third position 902C. In the embodiment illustrated in FIGS. 9G-9H, placing the latch cover in the third position 902C is accomplished by moving the latch cover 400 substantially in the negative z-direction. In the third position 902C, the latch cover 400 is installed with respect to the module 100. Additionally, in some embodiments, placing the latch cover 400 in the third position 902C may further compress the spring 600 between the internal surface 410 of the latch cover 400 and the stopper feature 302.

In alternative embodiments, the latch cover 400 may be installed by transitioning the latch cover 400 into the second position or moving the latch cover in a different direction. In yet alternative embodiments, the latch cover 400 and/or the module may include specific features specifically for securing the latch cover 400 to the module 100 in the third position 902C.

The present invention may be embodied in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A module comprising:
   a shell;
   a printed circuit board assembly ("PCBA") at least partially positioned within the shell;
   an optical transmitter electrically coupled to the PCBA;
   an optical receiver electrically coupled to the PCBA; and
   a biasing assembly including:
      a latch cover configured to be attached to the shell;
      a slider configured to operate a latching mechanism that releasably connects the module to a host device through a mechanical connection, the slider including a main body including a first end, an arm extending from the first end, and a stopper feature extending from the arm;
      a spring positioned between the latch cover and the stopper feature to bias the latching mechanism;
      the latch cover defining a spring opening configured to enable insertion of the spring through the latch cover and against the stopper feature when the latch cover is in a first position and to capture the spring between the latch cover and the stopper feature when the latch cover is in a second position; and
      the spring opening including an insertion hole configured to align with the stopper feature when the latch cover is in the first position and an extraction slot extending from the insertion hole, the extraction slot configured such that with the latch cover is in the second position, a second spring end abuts the latch cover in a region surrounding the extraction slot.

2. The module of claim 1, wherein the biasing assembly biases the latching mechanism to maintain the mechanical connection between the module and the host device.

3. The module of claim 1, further comprising a spring guide configured to insert a spring received on the spring guide through the spring opening.

4. The module of claim 3, wherein the spring guide is further configured to be extracted through an extraction slot and to leave the spring captured between the latch cover and the stopper feature.

5. The module of claim 1, further comprising an inverse cover spring shoulder and an inverse module spring shoulder, the inverse cover spring shoulder and the inverse module spring shoulder configured to confine the spring.

6. The module of claim 1, wherein the spring abuts a spring-end contact region on the latch cover.

7. The module of claim 1, wherein the module is substantially compliant with the CXP form factor.

8. A module comprising:
   a shell;
   a printed circuit board assembly ("PCBA") at least partially positioned within the shell;
   an optical transmitter or an optical receiver electrically coupled to the PCBA; and
   a biasing assembly comprising:
      a slider configured to operate a latching mechanism configured to releasably connect a module to a host device, the slider including a stopper feature; and
      a latch cover defining a spring opening, the spring opening defined to enable insertion of a spring through the latch cover when the latch cover is in a first position and to capture the spring between the latch cover and the stopper feature when the latch cover is in a second position, the spring opening including an insertion hole configured to align with the stopper feature when the latch cover is in the first position, and an extraction slot that extends from the insertion hole, the extraction slot configured to prevent retraction of the spring through the latch cover while the latch cover transitions to the second position.

9. The module of claim 8, wherein the insertion hole is configured to receive a spring guide, the spring guide configured to receive a spring and to insert the received spring through the insertion hole, and to be extracted through an extraction slot.

10. The module of claim 8, wherein the spring abuts a spring-end contact region on the latch cover.

11. The module of claim 8, the biasing assembly further comprising a boot operably connected to the slider.

12. A module comprising:
   a shell;
   a printed circuit board assembly ("PCBA") at least partially positioned within the shell;
   an optical transmitter or an optical receiver electrically coupled to the PCBA; and
   a biasing assembly comprising:
      a slider configured to operate a latching mechanism configured to releasably connect a module to a host device, the slider including a stopper feature; and
      a latch cover defining a spring opening, the spring opening defined to enable insertion of a spring through the latch cover when the latch cover is in a first position and to capture the spring between the latch cover and the stopper feature when the latch cover is in a second position, the spring opening comprising:

an insertion hole configured to align with the stopper feature when the latch cover is in the first position; and an extraction slot that extends from the insertion hole, the extraction slot configured to prevent retraction of the spring through the latch cover while the latch cover transitions to the second position.

13. The module of claim 12, wherein the biasing assembly biases the latching mechanism to maintain the mechanical connection between the module and the host device.

14. The module of claim 12, wherein the module is substantially compliant with the CXP form factor.

15. The module of claim 12, further comprising a spring guide configured to insert the spring received on the spring guide through the spring opening.

16. The module of claim 15, wherein the spring guide is further configured to be extracted through an extraction slot and to leave the spring captured between the latch cover and the stopper feature.

17. The module of claim 12, wherein the spring abuts a spring-end contact region on the latch cover.

18. The module of claim 12, the biasing assembly further comprising a boot operably connected to the slider.

19. The module of claim 18, wherein the boot includes a handle.

20. The module of claim 12, further comprising an inverse cover spring shoulder and an inverse module spring shoulder, the inverse cover spring shoulder and the inverse module spring shoulder configured to confine the spring.

\* \* \* \* \*